(12) United States Patent
Poulos

(10) Patent No.: US 8,628,044 B2
(45) Date of Patent: Jan. 14, 2014

(54) STABILIZATION OF UNSTABLE SPACE DEBRIS

(75) Inventor: Dennis Poulos, Redondo Beach, CA (US)

(73) Assignee: Poulos Air & Space, Redondo Beach, CA (US)

( * ) Notice: Subject to any disclaimer, the term of this patent is extended or adjusted under 35 U.S.C. 154(b) by 0 days.

(21) Appl. No.: 13/531,199

(22) Filed: Jun. 22, 2012

(65) Prior Publication Data

US 2012/0286098 A1    Nov. 15, 2012

Related U.S. Application Data

(62) Division of application No. 12/952,886, filed on Nov. 23, 2010, now Pat. No. 8,226,046.

(60) Provisional application No. 61/264,386, filed on Nov. 25, 2009.

(51) Int. Cl.
    *B64G 1/64*    (2006.01)
(52) U.S. Cl.
    USPC ................... 244/172.4; 244/158.1; 244/171.7
(58) Field of Classification Search
    USPC .............. 244/158.1, 172.6, 172.5, 172.4, 169
    See application file for complete search history.

(56) References Cited

U.S. PATENT DOCUMENTS

| | | | | |
|---|---|---|---|---|
| 3,268,091 | A | * | 8/1966 | Melton .......................... 414/728 |
| 4,407,469 | A | | 10/1983 | Fox |
| 4,936,528 | A | * | 6/1990 | Butner et al. .............. 244/171.7 |
| 5,082,211 | A | | 1/1992 | Werka |
| 5,153,407 | A | | 10/1992 | Schall |
| 5,163,641 | A | * | 11/1992 | Yasaka .......................... 244/164 |
| 5,687,933 | A | | 11/1997 | Goodzeit et al. |
| 5,947,421 | A | * | 9/1999 | Beattie et al. .............. 244/171.1 |
| 6,655,637 | B1 | | 12/2003 | Robinson |
| 7,118,075 | B2 | * | 10/2006 | Schubert ....................... 244/169 |
| 7,293,743 | B2 | | 11/2007 | Cepollina et al. |
| 7,438,264 | B2 | | 10/2008 | Cepollina et al. |
| 7,513,459 | B2 | | 4/2009 | Cepollina et al. |
| 7,513,460 | B2 | | 4/2009 | Cepollina et al. |
| 8,025,002 | B2 | * | 9/2011 | Piccionelli ....................... 89/1.1 |
| 2007/0285304 | A1 | * | 12/2007 | Cooper ........................... 342/62 |

OTHER PUBLICATIONS

PCT Application No. US10/057665 ISR dated Sep. 14, 2011.
US Notice of Allowance—U.S. Appl. No. 12/952,886 dated Jun. 19, 2012.

\* cited by examiner

*Primary Examiner* — Tien Dinh
*Assistant Examiner* — Michael Kreiner
(74) *Attorney, Agent, or Firm* — Wilson, Sonsini, Goodrich & Rosati

(57) ABSTRACT

Disclosed herein, in certain embodiments, is a method of altering the stability of unstable space debris. In some embodiments, the method further comprises changing the orbit of the unstable space debris.

13 Claims, 8 Drawing Sheets

STABILIZATION OF UNSTABLE SPACE DEBRIS

CROSS-REFERENCE

This application is a divisional of U.S. patent application Ser. No. 12/952,886, filed Nov. 23, 2010, now U.S. Pat. No. 8,226,046; which claims priority from U.S. Provisional Patent Application 61/264,386, filed Nov. 25, 2009, all of which are incorporated herein by reference in their entirety.

BACKGROUND OF THE INVENTION

There are over 20,000 pieces of man-made (artificially introduced) space debris currently being tracked in orbit around the Earth. Some space debris is found in Low Earth Orbit (LEO) (e.g., at altitudes between 200 km and 2,000 km). Some space debris is found in Medium Earth Orbit (MEO) (e.g., at altitudes between 2,000 km and 35,586 km). Some space debris is found in Geosynchronous Earth Orbit (GEO) (e.g., at altitude of 35,786 km±200 km). Some space debris is found at altitudes in excess of the GEO belt. Much of the space debris (approximately 40%) is concentrated in stable circular or elliptical orbits between 200 km and 2,000 km.

SUMMARY OF THE INVENTION

Space debris is a growing issue threatening the ability to safely operate spacecraft in Earth Orbit. Because space debris is not under active positive control, it represents a collision hazard to spacecraft. Currently, it is the spacecraft that is acted upon (e.g., maneuvered to avoid a collision). However, maneuvering to avoid debris is costly. It artificially decreases the useful life of the spacecraft (e.g., satellites or payloads) by expending fuel that is intended for other mission essential events.

Alternatively, the unstable space debris can be acted upon—it can be removed from the orbital path of a spacecraft. While the capability to rendezvous with space objects and conduct proximity operations in the vicinity of those objects has been demonstrated, there is currently no demonstrated means of stabilizing unstable space debris so that (a) the unstable space debris may be captured for de-orbit or (b) the orbital parameters of the debris may be changed to either maneuver the debris into a safe orbit or for de-orbit. Safe techniques to stabilize space debris in a zero gravity and zero pressure environment is one of the technical challenges that has yet to be addressed to by the space community. Thus, there is a need for a method of stabilizing unstable space debris.

Disclosed herein, in certain embodiments, is a method of stabilizing unstable space debris, comprising: applying force to the unstable space debris at target points on the unstable space debris, generating stabilized space debris; wherein the force is generated by pneumatic impingement of the unstable space debris with a gas plume applied by an adjacent satellite; and wherein the force is sufficient to generate a torque on the unstable space debris that will dampen the rotational momentum about one or more of the axes of rotation of the unstable space debris. In some embodiments, the amount of force being applied to the unstable space debris is a function of the motion of the unstable space debris, the state vector for the Center of Mass of the unstable space debris, the mutually orthogonal axes of rotation of the unstable space debris, the Moments of Inertia of the unstable space debris, the rotational momentum of the unstable space debris, the target points of the unstable space debris, or any combination thereof. In some embodiments, the amount of force being applied does not damage the target points. In some embodiments, the target points are located on, or near to, each of the three mutually orthogonal axes of rotation centered at the Center of Mass. In some embodiments, each target point is (a) located on, or near to, each of the three mutually orthogonal axes of rotation centered at the Center of Mass, and (b) structurally rigid enough to absorb the force without being compromised. In some embodiments, the target point(s) on the unstable space debris are a function of the Center of Mass, the direction and magnitude of the velocity vector of the Center of Mass, the moments of inertia and the rotational momentum about the mutually orthogonal axes of rotation of the body of the unstable space debris, or any combination thereof. In some embodiments, the number of pulses of the gas plume required to stabilize one of the three mutually orthogonal axes of rotation centered at the Center of Mass is independent of the number of pulses of gas required to stabilize the other two axes of rotation. In some embodiments, the gas plume comprises a gas selected from: nitrogen gas; xenon gas; argon gas; neon gas; high velocity residual affluent from chemical combustion of an oxidizer and a propellant; high velocity residual affluent from the exothermal chemical decomposition of a monopropellant on a catalyst; hydrogen gas; helium gas; or a combination thereof. In some embodiments, the gas plume issues from a nozzle selected from a divergent nozzle, a convergent nozzle, and a collimated nozzle. In some embodiments, the gas plume issues from a nozzle adjacent to at least one target point. In some embodiments, the gas plume issues from a nozzle adjacent to one of the axes of rotation of the unstable space debris. In some embodiments, the gas plume issues from a nozzle found on a mechanically deployable arm. In some embodiments, the method further comprises capturing the stabilized space debris. In some embodiments, the method further comprises changing the orbital parameters of the stabilized space debris.

Disclosed herein, in certain embodiments, is a satellite for stabilizing unstable space debris, comprising (a) routine systems and subsystems for the operation of the satellite, and (b) a means for generating and directing a gas plume sufficient to dampen the rotational momentum about one or more of the axes of rotation of the unstable space debris. In some embodiments, the satellite further comprises an active control system for maintaining the position and attitude of the satellite during proximity operations and while using the gas impingement system to stabilize or change the orbital parameters of the unstable space debris. In some embodiments, the satellite further comprises a means for analyzing the motion of the unstable space debris. In some embodiments, the satellite further comprises a laser tracking system, a radar (or other radio frequency) tracking system, an optical tracking system, or a combination thereof. In some embodiments, the satellite further comprises a laser or radar tracking system and an optical tracking system. In some embodiments, the satellite further comprises a means for calculating the strength of the pulse of the gas plume, and the number, duration, and timing of the pulses of the gas plumes to be applied to the unstable space debris. In some embodiments, the satellite further comprises a means of being serviced and refueled so that it can stabilize, capture or change the orbits of multiple pieces of space debris without have to be de-orbited itself or without have to have new satellites launched into space.

Disclosed herein, in certain embodiments, are methods of stabilizing unstable space debris, comprising: applying a force to one or more target point(s) located on mutually orthogonal axes that are centered on the Center of Mass (CM)

of the unstable space debris, wherein the force(s) produce a torque on the unstable space debris that is sufficient to dampen the rotational momentum about one or more of the axes of rotation of the unstable space debris, and wherein the force is generated and applied by an adjacent satellite. In some embodiments, applying a force comprises impingement of the unstable space debris with a gas plume generated by the adjacent satellite. In some embodiments, one pulse of a gas plume impinges on the unstable space debris. In some embodiments, multiple pulses of a gas plume impinge on the unstable space debris. In some embodiments, the number of pulses of a gas plume required to stabilize an axis of motion on the unstable space debris is independent of the number of pulses of a gas plume required to dampen the moments of inertia about the other axes of motion of the unstable space debris. In some embodiments, the gas plume consists of: nitrogen gas; xenon gas; argon gas; neon gas; gaseous ammonia; freon gas; high pressure residual affluent from chemical combustion of an oxidizer and a propellant; high pressure residual affluent from the chemical reaction between a monopropellant (e.g., hydrazine, monomethylhydrazine, a variant thereof, or hydrogen peroxide), and a catalyst; hydrogen gas; helium gas; ionized cesium; ionized mercury; plasmas generated from compounds such as teflon; or a combination thereof. In some embodiments, the gas plume is generated by compressing the gas. In some embodiments, the gas plume is generated by combustion of an oxidizer and a propellant. In some embodiments, the gas plume is generated by the exothermic chemical decomposition of a monopropellant reacting with a catalyst. In some embodiments, the gas plume is generated by electrothermal, electrostatic, or electromagnetic acceleration of one or more propellants. In some embodiments, target point(s) on the unstable space debris are determined by computer analysis, human analysis, or a combination thereof. In some embodiments, target point(s) on the unstable space debris are a function of (a) the Center of Mass, (b) the direction and magnitude of the rotation about the Center of Mass of the body of the unstable space debris and (c) the direction and magnitude of the velocity vector of the Center of Mass of the body of the unstable space debris. In some embodiments, target point(s) on the unstable space debris are a function of the three mutually orthogonal axes of motion centered at the Center of Mass. In some embodiments, target point(s) on the unstable space debris have sufficient structurally rigidity to absorb the applied force without being compromised (i.e., damaged). In some embodiments, target point(s) on the unstable space debris are (a) on, or near, one or more of the three mutually orthogonal axes of motion, and (b) have sufficient structurally rigidity to absorb the applied force without being compromised (i.e., damaged). In some embodiments, the amount of force applied to the unstable space debris is a function of (a) the motion of the debris, (b) the state vector for the Center of Mass of the unstable space debris, (c) the mutually orthogonal axes, (d) the Moments of Inertia, (e) rotational momentum, (f) the distance of the target points from the Center of Mass, or (g) any combination thereof. In some embodiments, the force applied to the unstable space debris does not exceed the structural limitations of the target points. In some embodiments, the force is generated and applied by a single satellite with multiple mechanically articulated arms. In some embodiments, the force is generated and applied by multiple adjacent satellites. In some embodiments, the force is generated and applied by one adjacent satellite per axis of rotation. In some embodiments, the force is generated and applied by multiple satellites per axis of rotation. In some embodiments, the method further comprises altering the orbital path of the unstable space debris. In some embodiments, the method further comprises capturing the unstable space debris for de-orbit. In some embodiments, the method further comprises changing the orbital parameters of the unstable space debris.

Disclosed herein, in certain embodiments, are satellites for stabilizing unstable space debris, comprising: (a) satellite bus with standard subsystems and interfaces, (b) a means for generating and projecting a force sufficient to dampen the rotational momentum about one or more of the axes of rotation of the unstable space debris, (c) one or more external sensors (radar, laser radar (LIDAR), optical, or imaging sensors), and (d) and an electronic system designed to analyze the data from the sensors and develop a stabilization plan which includes the force, duration, number, direction and magnitude of the pneumatic (gas) jets (plumes). In some embodiments, the satellite further comprises an active control system for maintaining the position of the satellite. In some embodiments, the satellite further comprises a reaction control system (RCS), control moment gyroscopes (CMG), magnetic torque converters for attitude control, or a combination thereof. In some embodiments, the satellite further comprises a means for remotely scanning and analyzing the motion of the unstable space debris. In some embodiments, the satellite further comprises a laser tracking system. In some embodiments, the satellite further comprises a radar tracking system. In some embodiments, the satellite further comprises an optical tracking system. In some embodiments, the satellite further comprises a means for calculating the amount of force to be applied to the unstable space debris (the number, duration and timing of pneumatic (gas) pulses (plumes) to be projected towards and impinge on the target points on the unstable space debris) or a combination thereof. In some embodiments, the satellite further comprises an on-board computer module. In some embodiments, the satellite further comprises a de-orbit module for attachment to the stabilized space debris. In some embodiments, the de-orbit module comprises a rocket motor and fuel with sufficient thrust to put the space debris into a reentry path and a guidance, navigation and control system. In some embodiments, the satellite further comprises a means for collecting the unstable space debris. In some embodiments, the satellite further comprises a deployable robotic arm. In some embodiments, the satellite further comprises a container for capturing stabilized space debris. In some embodiments, the satellite further comprises a means for storing the captured space debris. In some embodiments, the satellite further comprises a container for storing the captured space debris. In some embodiments, the satellite is serviceable. In some embodiments, the satellite is refuelable.

Disclosed herein, in certain embodiments, is space debris that is stabilized by a method disclosed herein.

Disclosed herein, in certain embodiments, is space debris that is captured by a method disclosed herein.

Disclosed herein, in certain embodiments, is space debris that is de-orbited by a method disclosed herein.

Disclosed herein, in certain embodiments, is space debris that is stabilized by use of the satellite disclosed herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
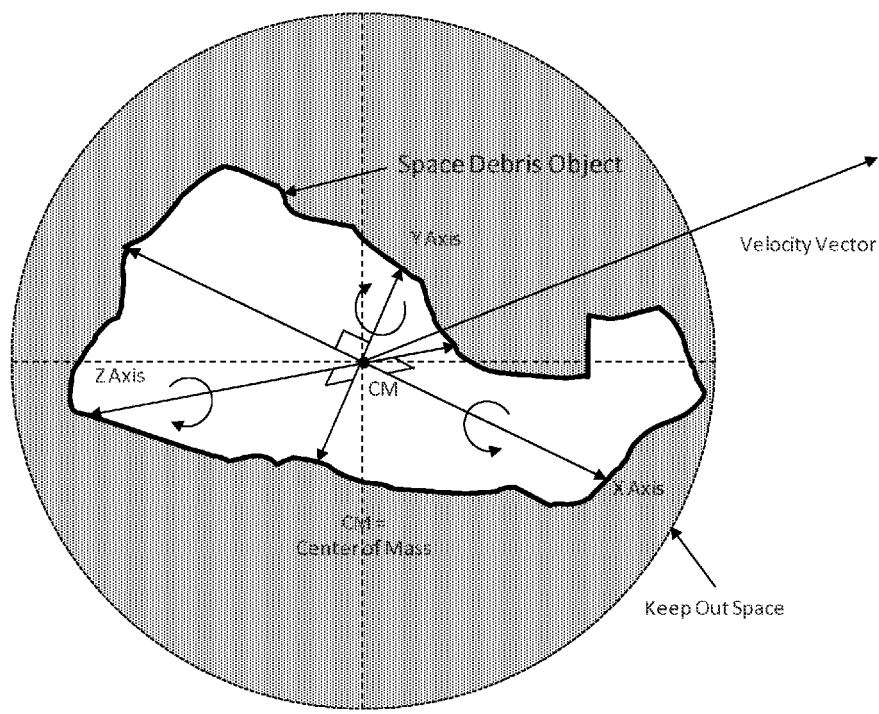
FIG. 1 illustrates the coordinate system and axes of motion of unstable space debris.

Space debris includes inoperative satellites and payloads, expended rocket stages which are not de-orbited, and the residual debris from of satellites and payloads which catastrophically fail. While functioning normally, satellites and payloads are actively or passively controlled by internal control systems. At the "end of life" (EOL) of these systems, those satellites and payloads that are not de-orbited are uncontrolled and therefore may become unstable. Additionally, satellites and payloads may unexpectedly fail before the designed EOL at which time they may become uncontrollable and unstable. As a result they may begin to tumble or rotate in one or more axes of motion (becoming unstable). Expended rocket stages which are not de-orbited, and residual debris from of satellites and payloads which catastrophically fail, may have no control system and their rotational motion may also be unstable.

Space debris is a growing issue threatening the ability to safely operate spacecraft in Earth orbit. Because space debris is not under active positive control, it represents a collision hazard to other spacecraft. Currently, it is the operative spacecraft that are acted upon (e.g., maneuvered to avoid a collision). However, maneuvering to avoid debris is costly. It artificially decreases the useful life of operational satellites (and the associated payloads) by expending fuel that is intended for other mission essential events.

Alternatively, the unstable space debris can be acted upon—it can be removed from the orbital path of a spacecraft. While the capability to rendezvous with space objects and conduct proximity operations in the vicinity of those objects has been demonstrated, there is currently no demonstrated means of stabilizing space debris with unstable rotation motion (hereinafter, "unstable space debris") so that (a) the space debris may be captured for de-orbit or (b) the orbital parameters of the space debris may be changed. Safe techniques to stabilize unstable space debris in a zero gravity and zero pressure environment is one of the technical challenges that has yet to be demonstrated. Thus, there is a need for methods of stabilizing unstable space debris.

Certain Terminology

As used herein, "satellite" means any object which has been placed into orbit by human endeavor. In some embodiments, the satellite is capable of autonomous control. In some embodiments, the satellite is controlled by a ground-based operator.

As used herein, "space debris" means inoperative man-made objects found in space and natural objects found in space. In some embodiments, space debris is the residue of launch (inoperative boosters or debris that is released from a rocket body during powered operation); the residue of staging (explosive bolt residue or other hardware that is deployed or activated during staging); satellites or payloads that unexpectedly cease to operate or are uncontrollable but otherwise are intact; satellites or payloads that catastrophically fail; satellites or payloads that break up by causes other than catastrophic failure; satellites or payloads that are damaged or break up due to impact with other satellites or payloads or natural objects; and debris of satellites or payloads that are physically attacked or cease to operate due to military action.

As space debris is not under active control, it tends to be unstable. In certain instances, the motion of space debris is a combination of tumbling, yawing and rotation which, when coupled in three dimensions, produces unstable, random, or chaotic (i.e., non-uniform) motion. In the case of larger pieces of space debris, the object may have large moments of inertia and the unstable motion may generate significant rotational momentum.

As used herein, "pneumatic impingement" means impinging an object with a gas plume. In some embodiments, the gas plume has sufficient force to generate a torque on the space debris. In some embodiments, the object is unstable space debris.

As used herein, "stable" means the state in which dynamic motion of an object in space, measured relative to a fixed frame of reference, is reduced to about zero (or, is substantially zero) about at least two of the three principal axes of motion and the dynamic motion around the third is not accelerating, or is decelerating to zero.

As used herein, "stabilize" means the application of force to an object in space, that is in unconstrained motion, so as to reduce the dynamic motion of that object, measured relative to a fixed reference frame, to about zero (or, to substantially zero) about at least two of the three principal axes of motion and the dynamic motion around the third is not accelerating, or is decelerating to about zero.

As used herein, "stabilized" means space debris with reduced dynamic motion, measured relative to a fixed reference frame. In some embodiments, the dynamic motion has been reduced to about zero (or substantially zero) about at least two of the three principal axes of motion and the dynamic motion around the third is not accelerating, or is decelerating to zero As used herein, the terms "gas plume", "gas jet" and "gas stream" are used interchangeably and mean a body of gas that is expelled through an opening at high speed. The gas moves in the same direction at (generally) the same time. None of the terms imply the body of gas has a particular shape. In some embodiments, the gas plume is divergent, linear (i.e., non-divergent), or convergent (i.e., focused).

As used herein, "orbital parameters" means the three spatial dimensions which define position, the velocity in each of these dimensions, as measured in reference to an inertial frame of reference, and the acceleration in each of these dimensions, as measured in reference to an inertial frame of reference.

As used herein, "keep out space" means the minimum separation between unstable space debris and a satellite disclosed herein to ensure the safety of the satellite. In some embodiments, the keep out space is defined by the volume of space in which unstable space debris rotates, yaws and/or tumbles.

As used herein, "station keeping operations" means maneuvers used to keep a spacecraft in an assigned orbit or at a specified distance and direction from another object in space.

As used herein, the phrase "the rotational motion is substantially zero" means that the rotational motion is zero, is about 1% of the original rotational motion, about 2% of the original rotational motion, about 3% of the original rotational motion, about 4% of the original rotational motion, about 5% of the original rotational motion, about 6% of the original rotational motion, about 7% of the original rotational motion, about 8% of the original rotational motion, about 9% of the original rotational motion, or about 10% of the original rotational motion.

Current Approaches to Space Debris Stabilization

Space debris includes inoperative satellites and payloads, expended rocket stages which are not de-orbited, and the residual debris from of satellites and payloads which catastrophically fail. While functioning normally, satellites and payloads are actively or passively controlled by internal control systems. At the "end of life" (EOL) of these systems, those satellites and payloads that are not de-orbited are uncontrolled and therefore may become unstable. Additionally, satellites and payloads may unexpectedly fail before the designed EOL at which time they may become uncontrollable and unstable. As a result they may begin to tumble or rotate in one or more axes of motion (becoming unstable). Expended rocket stages which are not de-orbited, and residual debris from of satellites and payloads which catastrophically fail, may have no control system and their rotational motion is may also be unstable. There is a need for methods of stabilizing unstable space debris.

Methods of Stabilizing Unstable Space Debris

Disclosed herein, in certain embodiments, are methods of stabilizing unstable space debris. In some embodiments, the methods comprise applying a force to precise points on the debris (i.e., the target points).

Figure 2:
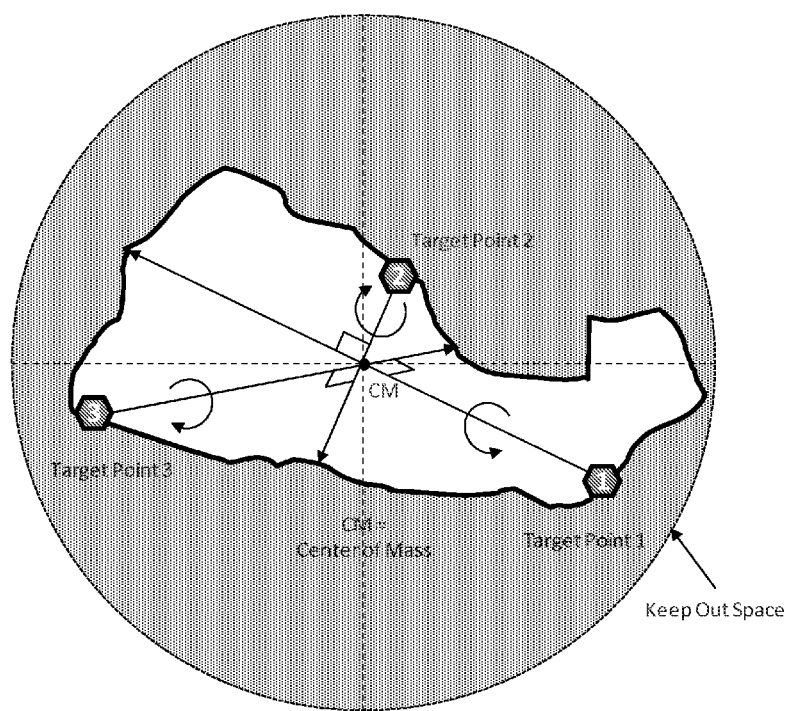
FIG. 2 is an example of gas impingement target points.
Figure 3:
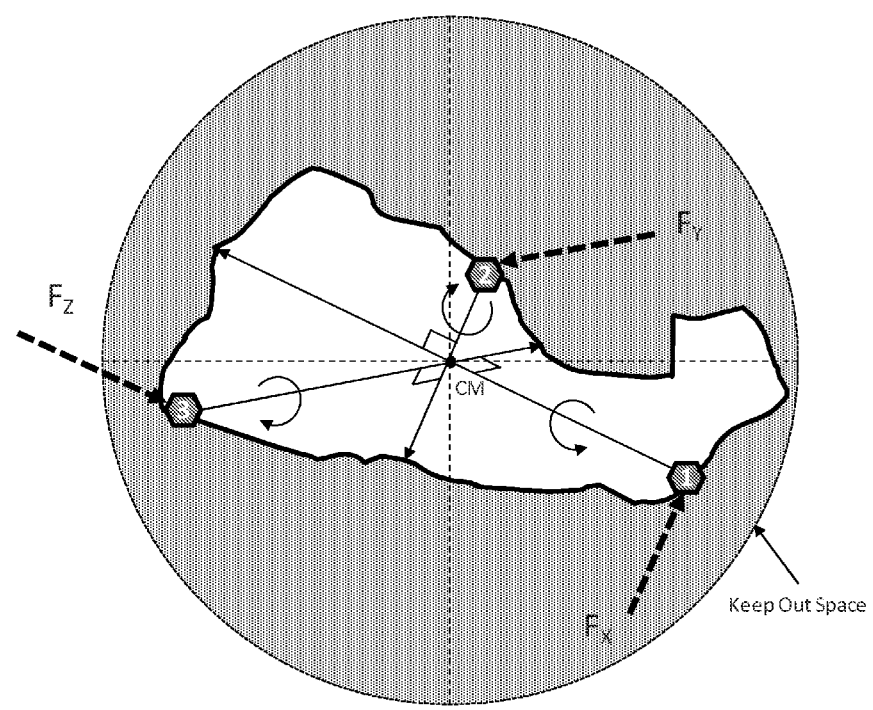
FIG. 3 illustrates the force vectors ($F_{X, Y, Z}$) imparted on space debris by the impingement system.

In some embodiments, the methods comprise pneumatic impingement at precise points on the debris. In some embodiments, the methods comprise impinging specific target point(s) on the debris with a gas plume [See FIG. 2]. In some embodiments, each target point is impinged simultaneously. In some embodiments, each target point is impinged sequentially.

In some embodiments, a gas plume is applied with sufficient force to dampen all moments of inertia of the debris. In some embodiments, a gas plume is applied until the rotational motion of space debris is reduced to about zero (or, the rotational motion is substantially zero) about at least two of the three axes of rotation.

In some embodiments, a pulse of a gas plume is applied to each target point. As used herein, "pulse" means a single and abrupt emission of a gas plume. The number of pulses depends on the total moment of inertia on each of the axes of rotation and the amount of force that each pulse imparts on each target point.

In some embodiments, a single pulse is applied to each target point. In some embodiments, a series of pulses (e.g., short pulses) is applied to each target point. In some embodiments, the number of pulses of a gas plume required to stabilize an axis of motion on the unstable space debris is independent of the number of pulses of a gas plume required to dampen the moments of inertia about the other axes of motion of the unstable space debris. In some embodiments, the change of the rotational momentum about an axis is calculated after each pulse. In some embodiments, the application of the gas to a target point is halted when the rotational motion about the axis of motion has stabilized. In some embodiments, the application of the gas to a target point is halted when the rotational motion is reduced to about zero (or, the rotational motion is substantially zero) about at least two of the three axes of rotation.

In order to stabilize unstable space debris that is unstable in all three axes, there must be at least one "target point" on, or near to, each of the mutually orthogonal axes. In order to access each of the target points, the opening through which a gas plume is expelled must be oriented such that the gas plume will impact the target points but is maintained outside the keep-out space. In some embodiments, the opening through which a gas jet is expelled is located on a maneuverable arm which is maneuvered into place. In some embodiments, the opening through which a gas jet is expelled is fixed to the satellite and maneuvered into place via positioning of the satellite and maintenance of the position and attitude while the pneumatic impingement system is operating.

Characteristics of the Gas Used for Pneumatic Impingement

Disclosed herein, in certain embodiments, are methods of stabilizing unstable space debris. In some embodiments, the methods comprise pneumatic impingement of the unstable space debris at specific target point(s). In some embodiments, the gas jet comprises any suitable gas. Factors influencing the suitability of a gas include, but are not limited to, whether the gas is accelerated via pressure (compression), whether the gas is accelerated via vaporization, whether the gas is accelerated via combustion, whether the gas is accelerated via exothermic chemical decomposition of a monopropellant reacting with a catalyst, whether the gas is accelerated via electromagnetic means, toxicity, cost, density, easy of handling, ease of storage, or a combination thereof.

In some embodiments, the methods comprise impinging target point(s) on the unstable space debris with a plume of cold or warm gas. As used herein, "cold gas" means a gas that has been pressurized by means of compression or evaporation and that is accelerated by the pressure differential between the internal pressures of the pressure vessel that the pressurized gas is contained in and the external pressure of the ambient environment ("space") and then expelled through an opening. The opening is any suitable opening. In some embodiments, the opening is a nozzle. In some embodiments, the opening is a divergent type nozzle, a convergent type nozzle, a linear-type (or, collimated-type) nozzle, or a combination thereof.

As used herein, "warm gas" means a gas that is accelerated and then expelled through an opening by means of vaporization. As used herein, "vaporization" means heating the liquid gas past its boiling point so that it transitions into a gas. The pressure in the chamber in which the liquid is vaporized increases significantly as the liquid vaporizes. The gas is accelerated as it is expelled through an opening by the pressure differential between the internal pressures in the vaporization chamber and the external pressure of the ambient environment ("space"). Exemplary gases that can be accelerated and then expelled through an opening by (a) compression or (b) vaporization include, but are not limited to: hydrogen ($H_2$), helium ($He_2$), xenon (Xe), argon (Ar), neon (Ne), freon, gaseous ammonia, or nitrogen ($N_2$). The opening is any suitable opening. In some embodiments, the opening is a nozzle. In some embodiments, the opening is a divergent type nozzle, a convergent type nozzle, a linear-type (or, collimated-type) nozzle, or a combination thereof.

In some embodiments, the methods comprise impinging target point(s) on the unstable space debris with a plume of hot gas. In some embodiments, the hot gas is the high velocity residual affluent resulting from chemical combustion of an oxidizer (e.g., liquid oxygen (LOX), gaseous oxygen (GOX), fluorine ($F_2$), oxygen difluoride ($OF_2$), Tetrafluorohydrazine ($N_2F_2$), Chlorine pentafluoride ($ClF_5$) or other similar oxidizers) and a propellant (e.g., hydrogen (H2), Kerosene products such as Rocket Propellant 1 (RP-1) and Rocket Propellant 2 (RP-2), Methane ($CH_4$), Monomethylhydrazine (MMH) or other such propellants) which is expelled at high velocity through an opening. In some embodiments, the gas is the high velocity residual affluent from the chemical decomposition of a monopropellant such as (but limited to) Hydrazine ($N_2H_4$) or hydrogen peroxide ($H_2O_2$) caused by an exothermic reaction between the propellant and a catalyst such as (but not limited to) iridium, silver or platinum which is expelled at high velocity through an opening.

In some embodiments, the methods comprise impinging target point(s) on the unstable space debris with a gas plume. In some embodiments, the gas is accelerated by electrothermal, electrostatic, or electromagnetic means which is expelled at high velocity through an opening. Exemplary gases that can be accelerated by electrothermal, electrostatic, or electromagnetic means include, but are not limited to, hydrogen ($H_2$), helium ($He_2$), xenon (Xe), argon (Ar), neon (Ne), nitrogen ($N_2$), ionized cesium (Cs), or ionized mercury (Mg).

In some embodiments, the opening through which the gas is expelled is situated relative to the unstable space debris such that the gas will impinge on target point(s) on the unstable space debris at the proper angle of impact.

In some embodiments, the opening through which the gas jet is expelled is any suitable size. The suitable size of the opening is dependent on multiple factors including, but not limited to, engineering analysis, how much force is to be generated, how long the pulses of gas should last, the distance from the opening to the point the gas jet is focused on, the temperature of the gas jet, and back pressure.

In some embodiments, the opening though with the accelerated gas is expelled is a divergent type nozzle which forms a conically shaped gas plume that diverges following expulsion from the nozzle. The portion of the affluent which impinges on the target points when the gas plume is formed by a divergent type nozzle is a function of the rate of divergence, the size of the target points, the distance from the nozzle, or any combination thereof; and will decrease proportionally as the range from the nozzle to the target point increases. In some embodiments, the opening though with the accelerated gas is expelled is a linear type (or, collimated-type) nozzle which forms a collimated gas plume that neither substantially diverges nor converges for a specified distance from the nozzle. The portion of the affluent which impinges on the target points when a linear nozzle forms a collimated gas plume is a function of the size of the collimated gas plume, the size of the target points, the pointing accuracy of the system used to direct the gas plume at the targets points, or any combination thereof; and will remain relatively constant with range (until the gas plume begins to diverge naturally in the far field). In some embodiments, the opening though with the accelerated gas is expelled is a convergent type nozzle which forms a gas plume that substantially converges the affluent to a specific point at a specified range (distance) from the nozzle following which it begins to diverge. The portion of the affluent which impinges on the target points when the gas plume is formed by a convergent nozzle is a function of the rate of convergence, the size of the target points, pointing accuracy of the system used to direct the gas plume at the targets points, the range from the nozzle, or any combination thereof; and will increase proportionally until the gas plume reaches the focus point at which point it will decrease as the range from the nozzle increases.

Determination of Target Points

Disclosed herein, in certain embodiments, are methods of stabilizing the unstable space debris. In some embodiments, the methods comprise application of force to precise target points on the unstable space debris such that the force will generate a torque on the unstable space debris that will dampen or counter the rotational momentum about one or more of the axes of rotation. In some embodiments, the methods comprise application of force to precise target points on the unstable space debris such that the force will reduce rotational motion to about zero (or, the rotational motion is substantially zero) about at least two of the three axes of rotation. In some embodiments, the methods comprise pneumatic impingement of the debris at precise target points.

In some embodiments, the target points on the unstable space debris are determined by analysis of the motion of the unstable space debris. In some embodiments, the methods comprise identifying (a) the Center of Mass and (b) the direction and magnitude of the velocity vector of the Center of Mass of the body of the unstable space debris. In some embodiments, the methods comprise identifying three mutually orthogonal axes of motion centered at the Center of Mass. In some embodiments, the methods comprise identifying the rotational direction, rates, moments of inertia, and rotational momentum of the body of the unstable space debris relative to the three mutually orthogonal axes of motion centered at the Center of Mass. In some embodiments, the target points are structural locations on the unstable space debris body. In some embodiments, the target points are structural locations on the unstable space debris body that are on, or near to, one of the three mutually orthogonal axes of motion. In some embodiments, the target points are structural locations on the unstable space debris body that are structurally rigid enough to absorb the force that the gas plume imparts on the unstable space debris. In some embodiments, the target points are structural locations on the unstable space debris body that are (a) on, or near to, one of the three mutually orthogonal axes of motion, and (b) structurally rigid enough to absorb the force that the gas plume imparts.

Determination of the Amount of Applied Force

Disclosed herein, in certain embodiments, are methods of stabilizing unstable space debris. In some embodiments, the methods comprise the application of force that generates a torque (e.g., pneumatic impingement) to the unstable space debris. In some embodiments, the force is applied at precise target points. In some embodiments, the force is applied until the rotational motion of the space debris is reduced to about zero (or, the rotational motion is substantially zero) about at least two of the three axes of rotation.

In some embodiments, the amount of force applied to the unstable space debris depends on (a) the motion of the debris, (b) the state vector for the Center of Mass of the unstable space debris, (c) the mutually orthogonal axes, (d) the Moments of Inertia, (e) rotational momentum and (f) the target points. In some embodiments, the methods comprise calculating the force to be applied to the debris.

In some embodiments, the force applied to the unstable space debris does not exceed the structural limitations of the target points. In some embodiments, the force applied to the unstable space debris does not result in structural failure. In some embodiments, the force applied to the unstable space debris does not result in the break up the unstable space debris.

In some embodiments, the structural limitations are determined by an analysis of the object (e.g., by analyzing the design schematics of the debris and the materials used to construct the debris). In some embodiments, the force applied to a target point is calculated before impingement (e.g., following a preceding impingement).

In some embodiments, the structural limitations are determined by a visual inspection of the debris, scanning of the debris, application of minimal force to the debris with a gradual increase in the force vector as necessary, or a combination thereof.

In some embodiments, the force applied to a target point is a function of the velocity of the gas plume and the mass of the gas plume that impacts the target point.

Modularity

In some embodiments, the space debris is large space debris. In some embodiments, large space debris that is in unstable random rotational motion defines a large volume of keep-out space. In certain instances, it is impractical to use deployable arms that are long enough to avoid the keep-out space generated by large space debris. Thus, in some embodiments, a method disclosed herein uses multiple satellites. In some embodiments, a method disclosed herein uses one satellite per axis of rotation. In some embodiments, a method disclosed herein uses multiple satellites per axis of rotation.

In some embodiments, each satellite is positioned such that (a) it has access to a target point, and (b) it avoids the keep-out space.

In some embodiments, each satellite operates independently. For example, each satellite is independently positioned via an earth-based operator.

In some embodiments, the satellites coordinate with each other autonomously. In some embodiments, the satellites coordinate with each other autonomously and are monitored via an earth-based operator.

In some embodiments, each satellite is capable of independently stabilizing small or medium sized space debris.

Sources of Force Other than Pneumatic Impingement

There are multiple methods that can be used to apply force to unstable space debris. In some embodiments, the force is applied via physical contact with a mechanical element (e.g., an arm or part of the satellite bus). However, the energy stored in the inertia motion or rotational momentum of the system may be sufficiently large to result in the structural failure of the debris or the mechanical element, thus creating additional debris.

In some embodiments, the force is applied via contacting the unstable space debris with a viscous liquid (e.g., water or a more complex liquid). In some embodiments, the viscosity and mass of the liquid imparts a force on the unstable space debris thus slowing its rotation.

In some embodiments, the force is applied via illuminating the unstable space debris with a laser. In some embodiments, the laser illuminates one side of the unstable space debris which vaporizes some of the material. In some embodiments, as the material is vaporized and ejected from the unstable space debris, it creates a force in the equal and opposite direction that is a function of the mass of the material being vaporized and the velocity at which it is expelled. In some embodiments, the laser creates a radiation pressure differential between the side of the space debris that the laser illuminates and the side of the space debris that the laser does not illuminate and this radiation pressure differential is sufficient to dampen the rotational momentum about one of more axes of rotation.

In some embodiments, the force is applied by generating an electromagnetic field that the unstable space debris rotates within. In some embodiments, the unstable space debris rotating in an electromagnetic field creates electrical currents (i.e., eddy currents) on the conductive material that the space debris is constructed of. In some embodiments, the interaction of the electrical currents and naturally occurring planetary magnetic fields creates an electromagnetic force on the unstable space debris which dampens the rotation of the object.

In some embodiments, the force is applied by contacting the unstable space debris with particulate material (e.g., sand or some other material). In some embodiments, the impact of the particulate material imparts a force and creates a drag about the axes of motion and slows the unstable space debris.

Methods of Altering the Orbit of Space Debris or Capturing Space Debris

Disclosed herein, in certain embodiments, are methods of capturing unstable space debris. Further disclosed herein, are methods of altering the orbital path of unstable space debris.

Capture of Space Debris

Disclosed herein, in certain embodiments, is a method of capturing space debris. In some embodiments, the space debris is small space debris with low rotational energy states. In some embodiments, the space debris is unstable and it is stabilized prior to capture. In some embodiments, the unstable space debris is stabilized by a method disclosed herein.

In some embodiments, a satellite disclosed herein and the space debris rendezvous. In some embodiments, the satellite matches energy states (e.g., orbital velocity) with the space debris. In some embodiments, the satellite captures the space debris by any suitable means. In some embodiments, the satellite captures the space debris by use of a deployable arm, bag, tow line, net, magnetic affecter, mechanical affecter or a combination thereof.

Changing Orbital Parameters

Disclosed herein, in certain embodiments, are methods of altering the orbital path of space debris. In some embodiments, the methods comprise changing the orbital parameters of space debris. In some embodiments, the space debris is unstable and it is stabilized prior to capture. In some embodiments, the methods first comprise stabilizing unstable space debris by a method disclosed here.

In some embodiments, the orbital parameters of the space debris are modified via attachment of a de-orbit module to the debris. In some embodiments, the de-orbit module is attached to the unstable space debris via use of a robotic arm. In some embodiments, the de-orbit module is attached to the unstable space debris by mechanically transferring the rocket pack following docking.

In some embodiments, the orbital parameters of the space debris are modified via application of force at precise points of the debris (i.e., the target points) intended to change the linear momentum and velocity vector of the space debris. In some embodiments, the orbital parameters of space debris are modified via pneumatic impingement at precise points on the debris.

In some embodiments, the methods comprise applying a force to specific target point(s) on the debris. In some embodiments, the methods comprise impingement by a gas plume at specific target point(s) on the debris [See FIG. 2]. In some embodiments, the gas plume impacts the debris with sufficient force to change the linear momentum and direction and magnitude of the velocity vector of the space debris.

In some embodiments, pulses of gas plumes are applied to one or more target points. In some embodiments, the gas plumes are applied to the target point(s) for an extended period of time. In some embodiments, the duration of each gas plume depends on the linear momentum and the total change of the direction and magnitude of the velocity vector of the unstable space debris that is required.

In some embodiments, the required velocity vector change is achieved by a single gas plume impingement event. In some embodiments, the required velocity vector change is achieved by multiple gas plume impingement events. In some embodiments, change in the velocity vector of the space debris is determined (e.g., calculated) after each gas impingement event. In some embodiments, the gas impingement on the target point(s) is halted when the required change in direction and magnitude of the unstable space debris velocity vector is achieved.

Satellite

Disclosed herein, in certain embodiments, are satellites for stabilizing an unstable space debris, comprising: (a) satellite bus with standard subsystems and interfaces, (b) a means for generating and projecting a force sufficient to dampen the rotational momentum about one or more of the axes of rotation of the unstable space debris, (c) one or more external sensors (radar, laser radar (LIDAR), optical, or imaging sensors), and (d) and an electronic system designed to analyze the data from the sensors and develop a stabilization plan which includes the force, duration, number, direction and magnitude of the pneumatic (gas) jets (plumes).

In some embodiments, a satellite disclosed herein is further capable of capturing the space debris which has been stabilized. In some embodiments, a satellite disclosed herein is further capable of altering the orbital path of space debris that has been stabilized.

In some embodiments, a satellite disclosed herein applies force to the space debris (e.g., unstable space debris, or space debris that has been stabilized). In some embodiments, a satellite disclosed herein applies force to unstable space debris to stabilize the debris. In some embodiments, a satellite disclosed herein applies force to the stabilized space debris to change the orbital path of the space debris. In some embodiments, a satellite disclosed herein applies force to the unstable space debris by pneumatic impingement. In some embodiments, pneumatic impingement results from a gas plume directed from the satellite.

Design

In some embodiments, the satellite comprises: a means for generating a force sufficient to dampen the rotational momentum about one or more of the axes of rotation of the unstable space debris or to alter the linear motion of the satellite and therefore changing its orbital parameters.

In some embodiments, the means for generating the force is a means for compressing a gas. A gas is compressed when it is forced, at high pressure, by a pump into a container or tank (a.k.a., pressure vessel). A gas may also be compressed by the injection into a pressure vessel containing an unpressurized gas of a benign (non-reactive) high pressure gas or liquid. The gas or liquid that is injected into the pressure vessel to compress the operating gas may be injected directly into the pressure vessel or it may be isolated from the operating gas that is being compressed by a bladder inside the pressure vessel designed to separate the operating gas and the compressing gas or liquid. The pressure vessel, having sufficient strength to hold the gas at high pressure, is connected by a system of tubes, connectors, and valves to an opening. The opening is any suitable opening. In some embodiments, the opening is part of a nozzle. In some embodiments, the opening is a divergent type nozzle, linear type (or, collimated-type) nozzle, a convergent type nozzle, or a combination thereof. When the valves are opened in the correct sequence, the gas is accelerated by the pressure differential between the internal pressures of the pressure vessel that the pressurized gas is contained in and the external pressure of the ambient environment ("space") and then expelled through the opening. The acceleration is a function of the pressure differential and the design of the opening. The force that is generated is a function of the acceleration and the mass of the gas that is expelled. The mass of the gas is a function of the pressure and the length of time (duration) that the values are open and closed. Exemplary gases that can be accelerated and then expelled through an opening by compression include, but are not limited to: hydrogen ($H_2$), helium ($He_2$), xenon (Xe), argon (Ar), neon (Ne), freon, gaseous ammonia, or nitrogen ($N_2$).

In some embodiments, the means for generating the force is a means for vaporizing a liquefied gas. "Vaporization" means heating the liquid gas past its boiling point so that it transitions into a gas. The pressure in the chamber in which the liquid is vaporized increases significantly as the liquid vaporizes. The gas is accelerated as it is expelled through the opening by the pressure differential between the internal pressures in the vaporization chamber and the external pressure of the ambient environment ("space"). Exemplary gases that can be accelerated and then expelled through an opening by vaporization include, but are not limited to: hydrogen ($H_2$), helium ($He_2$), xenon (Xe), argon (Ar), neon (Ne), freon, gaseous ammonia, or nitrogen ($N_2$).

In some embodiments, the means for generating the force is a means for combustion of an oxidizer and a propellant. The force is generated by the acceleration to a high velocity of the residual affluent resulting from chemical combustion of an oxidizer (e.g., liquid oxygen (LOX), gaseous oxygen (GOX), fluorine ($F_2$), oxygen difluoride ($OF_2$), Tetrafluorohydrazine ($N_2F_2$), Chlorine pentafluoride ($ClF_5$) or other similar oxidizers) and a propellant (e.g., hydrogen (H2), Kerosene products such as Rocket Propellant 1 (RP-1) and Rocket Propellant 2 (RP-2), Methane (CH4), Monomethylhydrazine (MMH) or other such propellants) after injection in a combustion chamber. After the oxidizer and propellant are injected and mixed in the combustion chamber, they can be ignited by the discharge of an electrical spark or current, explosive charge, laser heating or other methods. The combustion of the explosive mix of oxidizer and propellant become self sustaining and caused the pressure and temperature in the combustion chamber is significantly increased creating a highly energized affluent. The force that is generated is a function of the acceleration and the mass of the affluent that is expelled. The affluent is accelerated as it is expelled through the throat and then the expansion section of a nozzle by the pressure differential between the internal pressures in the combustion chamber and the external pressure of the ambient environment ("space").

In some embodiments, the means for generating the force is through the exothermic decomposition of a monopropellant. The force is generated by the acceleration to a high velocity of the residual affluent resulting from the chemical decomposition of a monopropellant such as (but limited to) Hydrazine ($N_2H_4$) or hydrogen peroxide ($H_2O_2$) caused by an exothermic reaction between the propellant and a catalyst such as (but not limited to) iridium, silver or platinum. Valves are opened or closed to control the amount of monopropellant is injected into the combustion chamber through a catalyst, the monopropellant decomposes exothermically, converting from a liquid to a high pressure and temperature gas. The force that is generated is a function of the acceleration, the mass of the affluent that is expelled and the duration that the valves are open so that the monopropellant can be injected into the combustion chamber. The affluent is accelerated as it is expelled through the throat and then the expansion section of a nozzle by the pressure differential between the internal pressures in the combustion chamber and the external pressure of the ambient environment ("space").

In some embodiments, the means for generating the force is by an electromagnetic means. In some embodiments, the force is generated when a gas is energized and accelerated by electrothermal, electrostatic, or electromagnetic means. As used herein, "electrothermal" means electromagnetic devices where electromagnetic fields are used to generate a plasma to increase the heat of the bulk propellant. In some embodiments, a plasma is accelerated by the Lorentz force resulting from the interaction between the current flowing through the plasma and the magnetic field (which is either externally applied, or induced by the current) out through the exhaust chamber. The force that is generated is a function of the acceleration and the mass of the plasma or ion stream that is expelled. The plasma or ion stream is accelerated as it is expelled through the throat and then the expansion section of a nozzle.

In some embodiments, low molecular weight gases (e.g. hydrogen, helium, ammonia) are preferred propellants for this kind of system. Exemplary gases and metals that can be accelerated by electrothermal, electrostatic, or electromagnetic means include, but are not limited to, hydrogen ($H_2$), helium ($He_2$), xenon (Xe), argon (Ar), neon (Ne), nitrogen ($N_2$), ionized cesium (Cs), or ionized mercury (Mg).

In some embodiments, the system which produces energized gas electrostaticly is an electrostatic ion thruster, a Hall affect thruster, a field emission electric propulsion system, or any combination thereof. In each case, ions are accelerated by the potential difference of a static electrical field between an anode and a cathode.

In some embodiments, the system which produces energized gas electromagnetically is an electrodeless plasma thruster, pulsed inductive thruster, helicon double layer thruster, a Magnetoplasmadynamic (MPD) thruster, or any combination thereof.

In some embodiments, the means for generating the force is by accelerating a liquid or particulate. In some embodiments, a liquid is compressed when it is forced, at high pressure, by a pump into a container or tank (a.k.a., pressure vessel). In some embodiments, a liquid is compressed by the injection directly into a pressure vessel containing an unpressurized liquid of a benign (non-reactive) high pressure gas or liquid. The gas or liquid that is injected into the pressure vessel to compress the operating liquid may be injected directly into the pressure vessel or it may be isolated from the operating liquid that is being compressed by a bladder inside the pressure vessel designed to separate the operating liquid and the compressing gas or liquid. The pressure vessel, having sufficient strength to hold the gas at high pressure, is connected by a system of tubes, connectors, and valves to an opening. The opening is any suitable opening. In some embodiments, the opening is part of a nozzle. The pressure vessel, having sufficient strength to hold the liquid at high pressure, is connected by a system of tubes, connectors, and valves to the opening. When the valves are opened in the correct sequence, the liquid is accelerated by the pressure differential between the internal pressures of the pressure vessel that the pressurized liquid is contained in and the external pressure of the ambient environment ("space") and then expelled through the opening. The acceleration is a function of the pressure differential and the design of the opening. The force that is generated is a function of the acceleration and the mass of the liquid that is expelled. The mass of the liquid is a function of the pressure and the length of time (duration) that the values are open and closed. In some embodiments, a particulate is used. In some embodiments, the particulate is injected into a high pressure gas pulse similar to the compressed gas system described above. The use of a particulate increases the mass and kinetic energy of the compressed gas jet plume.

In some embodiments, the means for generating the force is a laser. The laser illuminates one side of the unstable space debris which vaporizes some of the material. As the material is vaporized and ejected from the unstable space debris, it creates a force in the equal and opposite direction that is a function of the mass of the material being vaporized and the velocity at which it is expelled. Alternatively, the laser can produce a radiation pressure differential between the side of the space debris that the laser illuminates and the side of the space debris that the laser does not illuminate and the radiation pressure differential is sufficient to dampen the rotational momentum about one of more axes of rotation.

In some embodiments, the means for generating the force is a means for generating an electromagnetic field. An electromagnetic field is created whenever an electrical current is generated between two points. In some embodiments, an electrical current flowing in an antenna will create an electromagnetic field that emanates from the antenna. The shape of the antenna will determine the shape and directionality of the electromagnetic field. An electrical current will be generated in a conductive material that moves within an electromagnetic field. In some embodiments, the satellite using an electrical power source generates an electrical current in an antenna which will create an electromagnetic field that encompasses (shape and directionality) the space debris. Since the space debris is rotating within the electromagnetic field, and it may be constructed of so electrically conductive material, the rotational motion of the debris within the electromagnetic field will generate small electrical currents on, or within, the debris. The electrical currents on, or within, the debris will simultaneously interact with the naturally occurring planetary magnetic fields which surround the Earth creating a force that will attempt to align itself with those naturally occurring planetary magnetic fields. As the electrical currents on, or within the debris, begin to align themselves with the naturally occurring planetary magnetic fields they will generate a force that will tends to dampen the rotational motion of the debris in one or more of the axes of rotation.

In some embodiments, a satellite disclosed herein comprises a carriage for the means for generating a force sufficient to dampen the rotational momentum about one or more of the axes of rotation of the unstable space debris (e.g., a gas, a liquid, particulate matter, a laser, an electromagnetic field). In some embodiments, the carriage components comprise a storage tank, container, or pressure vessel. In some embodiments, the carriage components comprise a means for moving the source of the force (e.g., a gas, a liquid, particulate matter) from the storage tanks, containers or pressure vessels to the opening. In some embodiments, the means for moving the source of the force from the storage compartment to the opening is a series of interconnected pipes.

In some embodiments, a satellite disclosed herein comprises a carriage for the pneumatic components. In some embodiments, the carriage of the pneumatic components comprises a storage compartment. In some embodiments, the carriage of the pneumatic components comprises a means for moving the gas from the storage compartment to the opening. In some embodiments, the means for moving the gas from the storage compartment to the opening is a series of interconnected pipes.

In some embodiments, the satellite comprises an opening through which the force moves. The opening is any suitable opening. In some embodiments, the opening is part of a nozzle. In some embodiments, the opening is a divergent type nozzle, linear type nozzle, a convergent type nozzle, or a combination thereof. In some embodiments, the opening though with the accelerated gas is expelled is a divergent type nozzle which forms a conically shaped gas plume that diverges following expulsion from the nozzle. The portion of the affluent which impinges on the target points when the gas plume is formed by a divergent type nozzle is a function of the rate of divergence, the size of the target points, the distance from the nozzle, or any combination thereof; and will decrease proportionally as the range from the nozzle to the target point increases. In some embodiments, the opening though with the accelerated gas is expelled is a linear type nozzle which forms a collimated gas plume that neither substantially diverges nor converges for a specified distance from the nozzle. The portion of the affluent which impinges on the target points when a linear nozzle forms a collimated gas plume is a function of the size of the collimated gas plume, the size of the target points, the pointing accuracy of the system used to direct the gas plume at the targets points, or any combination thereof; and will remain relatively constant with range (until the gas plume begins to diverge naturally in the far field). In some embodiments, the opening though with the accelerated gas is expelled is a convergent type nozzle which forms a gas plume that substantially converges the affluent to a specific point at a specified range (distance) from the nozzle following which it begins to diverge. The portion of the affluent which impinges on the target points when the gas plume is formed by a convergent nozzle is a function of the rate of convergence, the size of the target points, pointing accuracy of the system used to direct the gas plume at the targets points, the range from the nozzle, or any combination thereof; and will increase proportionally until the gas plume reaches the focus point at which point it will decrease as the range from the nozzle increases.

In some embodiments, the opening through which the gas jet is expelled is any suitable size. In some embodiments, the suitable size of the opening is a function of engineering analysis, how much force is to be generated, the planned duration of the gas plume, the distance from the opening to the point that the gas jet is focused on, the temperature of the gas jet, back pressure, or any combination thereof.

In some embodiments, the opening is located on the main satellite body. In some embodiments, the opening is located on an arm attached to the satellite.

In some embodiments, a satellite disclosed herein comprises the physical structure (i.e., satellite bus) that contains normal satellite subsystems and external internal faces (e.g., physical structure, the computers, the wires, the batteries, the GNC system, the navigation sensors, the environmental control systems, the propulsion system, the communications system) As used herein, "satellite bus" means all the elements of a satellite described herein except for the payload (comprised of the pneumatic (plume) impingement system, the scanning sensors, de-orbit module, means for collecting the debris, and means for storing the debris).

In some embodiments, a satellite disclosed herein comprises a guidance system, navigation and control (GNC) system (including stabilization and attitude control), or a combination thereof.

In some embodiments, a satellite disclosed herein comprises a means for managing satellite subsystems and external interfaces. In some embodiments, the means for managing satellite subsystems and external interfaces is through a computer based vehicle management system (VMS). In some embodiments, the VMS operates autonomously, is operated remotely from a ground control station, or a combination of both.

In some embodiments, a satellite disclosed herein comprises a means for powering the satellite. In some embodiments, a satellite disclosed herein comprises a power management and distribution system. In some embodiments, the means for powering the satellite is any suitable powering mechanism. Examples of powering mechanisms include, but are not limited to: solar panels, thermal batteries, fuel cells, nuclear reactors, or a combination thereof.

In some embodiments, a satellite disclosed herein comprises a means for propulsion. In some embodiments, the means for propulsion is any suitable propulsion mechanism. Examples of propulsion mechanisms include, but are not limited to: chemical rocket engines, nuclear rocket engines, cold gas rocket engines, or electrical rocket engines.

In some embodiments, a satellite disclosed herein comprises a means for communication. In some embodiments, a satellite disclosed herein comprises multiple means for communication. In some embodiments, the means for communication comprises at least one antenna for receiving communications and transmitting communications. In some embodiments, communications are received and/or transmitted via radio waves, microwaves, optical frequency, or a combination thereof. In some embodiments, the radio is a physical radio. In some embodiments, the radio is a software radio. In some embodiments, the means for communication further comprises a computer module capable of encrypting communications.

In some embodiments, a satellite disclosed herein comprises external navigation sensors. Examples of external sensors include, but are not limited to, Radar, Laser Radar (LIDAR), GPS, optical sensors (e.g., sun sensors, star sensors, Earth sensors), optical trackers, or combinations thereof.

In some embodiments, a satellite disclosed herein comprises environmental conditioning. As used herein, "environmental conditioning" means systems for keeping the satellite from getting too warm or too cold. Examples of environmental conditioning systems include, but are not limited to: heaters, reflectors, heat pipes, radiators, or combinations thereof.

In some embodiments, the satellite further comprises a de-orbit module for attachment to the space debris. In some embodiments, the satellite comprises a means for attaching the de-orbit module to the unstable space debris. In some embodiments, the de-orbit module is attached to the unstable space debris via use of a robotic arm or by mechanical latches. In some embodiments, the de-orbit module is attached to the unstable space debris by mechanically transferring the rocket pack following docking.

In some embodiments, the satellite further comprises a means for collecting the unstable space debris. In some embodiments, the means for collecting the debris is a robotic arm. In some embodiments, the means for collecting the debris is a bag that scoops up the debris. In some embodiments, the means for collecting the debris is a net. In some embodiments, the means for collecting the debris is a magnetic affecter that magnetically attracts and then latches on to the ferrous metal elements of the unstable space debris.

In some embodiments, the satellite further comprises a means for storing the unstable space debris. In some embodiments, the means for storing the unstable space debris is a bag attached to the satellite. In some embodiments, the means for storing the unstable space debris is a box attached to the satellite. In some embodiments, the means for storing the unstable space debris is a tow line attached to the satellite. In some embodiments, the space debris is attached to the tow line via magnetic attraction, use of a hook, use of a clamp, use of a harpoon, or a combination thereof.

Dimensions

In some embodiments, the total volume of gas required to stabilize unstable space debris is directly proportional to the total moment of inertia of the unstable space debris.

In certain instances, the volume of gas or liquid required to stabilize a large space debris is significantly larger than the volume of gas or liquid required to stabilize a small space debris. Consequently, in some embodiments, the satellite is sized to stabilize the largest body of space debris that is anticipated. Alternatively, in some embodiments, the satellite is scalable and is produced in various overall sizes.

Maneuverability

In some embodiments, a satellite disclosed herein rendezvous with the unstable space debris. In some embodiment, a satellite disclosed herein maneuvers to rendezvous with the unstable space debris by changing its orbit to parallel the velocity vector of the Center of Mass of the unstable space debris. In some embodiments, a satellite disclosed herein maneuvers itself such that (a) it has access to the three mutually orthogonal axes (e.g., with one or more deployable arms or with one or satellites), and (b) it maintains a position outside the "keep out space" volume.

Figure 4:
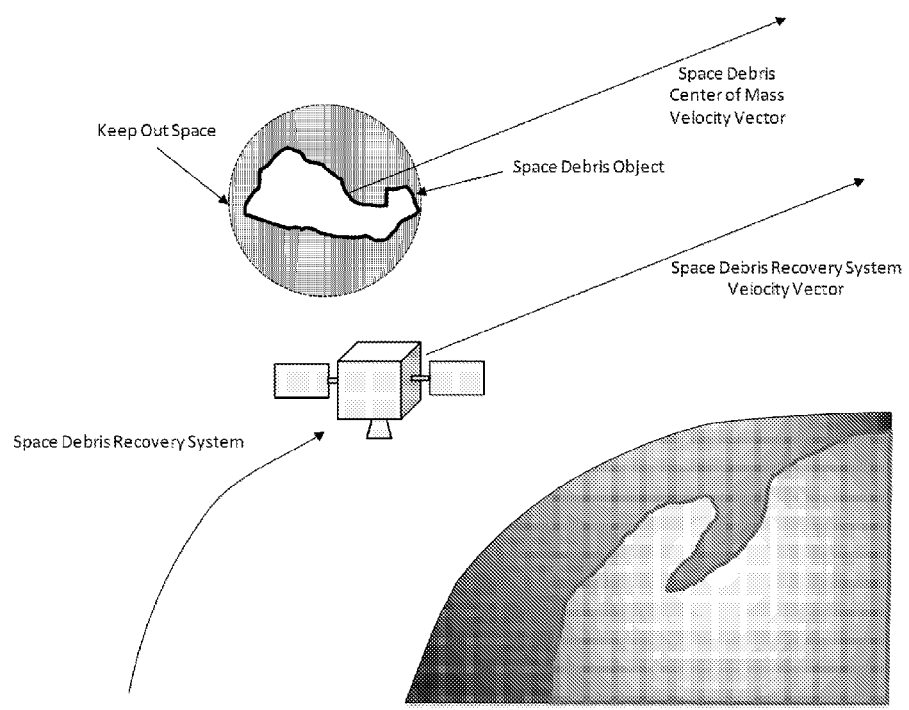
FIG. 4 illustrates a space debris recovery satellite maneuvering to rendezvous with space debris and conducting motion analysis.
Figure 5A:
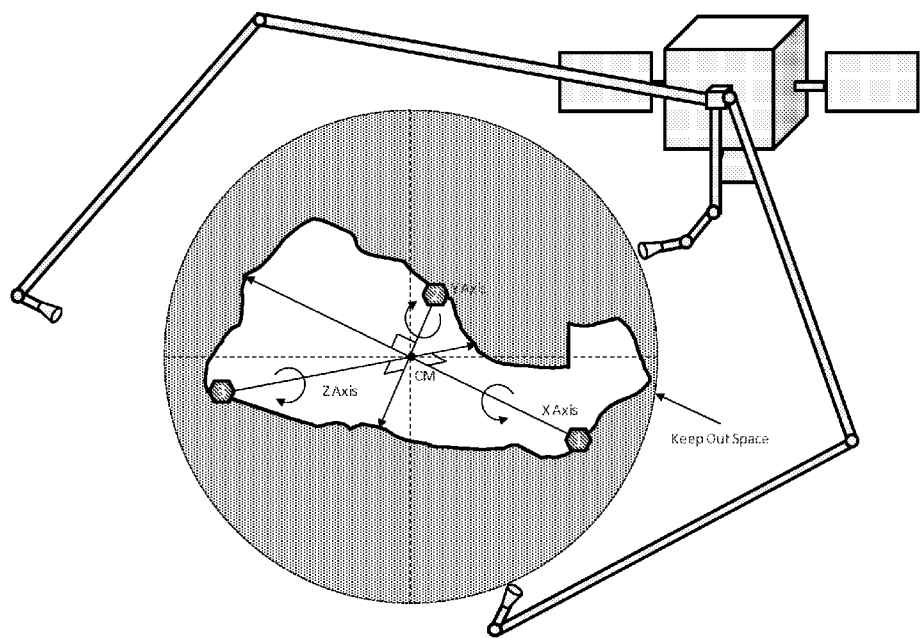
FIG. 5A illustrates a single space debris recovery satellite orienting pneumatic jets in reference to three orthogonal axes.
Figure 5B:
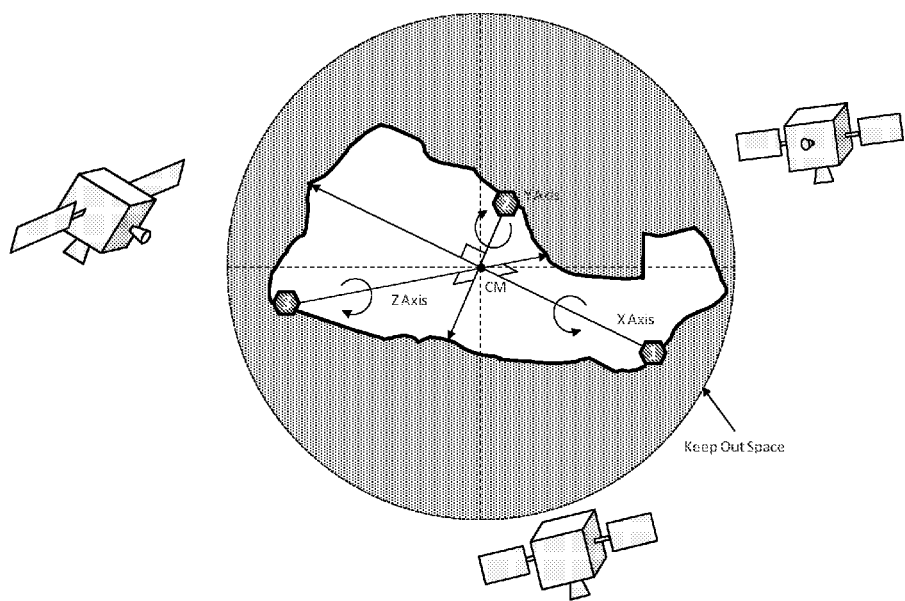
FIG. 5B illustrates multiple space debris recovery satellites orienting pneumatic jets in reference to three orthogonal axes.
Figure 6A:
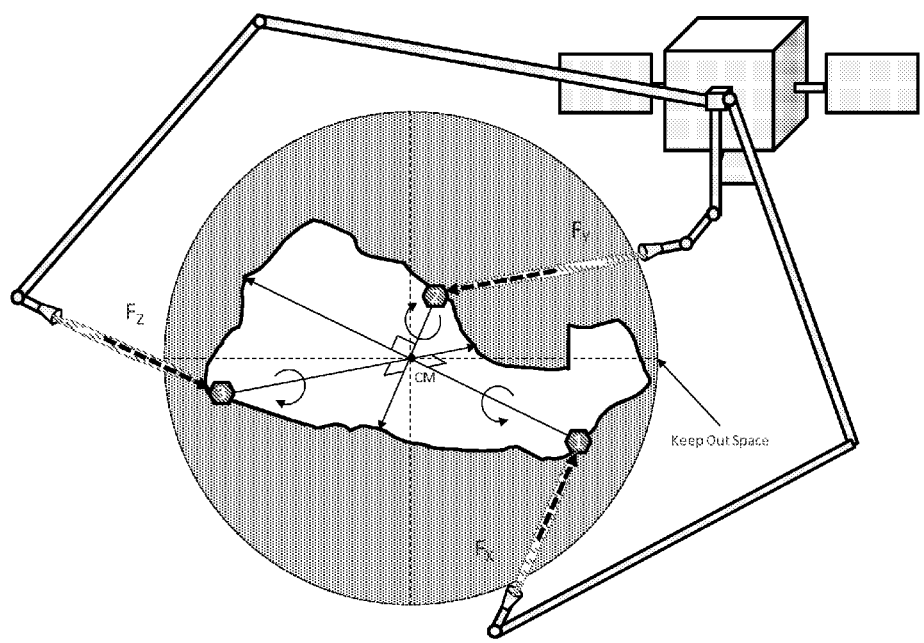
FIG. 6A illustrates a single space debris recovery satellite applying a gas plume to target points to stabilize space debris.
Figure 6B:
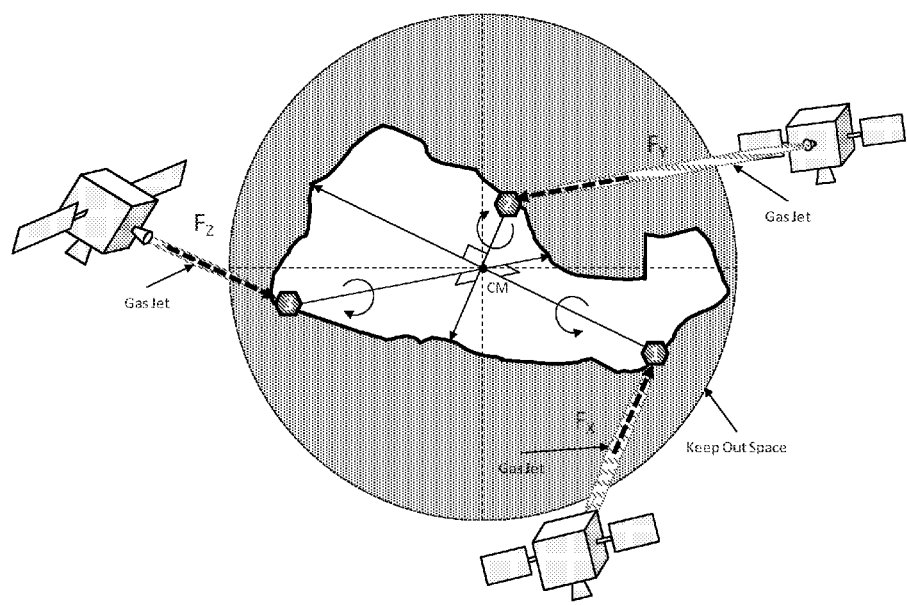
FIG. 6B illustrates multiple space debris recovery satellites applying a gas plume to target points to stabilize space debris.

In some embodiments, a satellite disclosed herein conducts proximity operations by maneuvering around the unstable space debris to (a) survey the debris (e.g., determine the condition of the debris), and (b) identify potential target points. In some embodiments, a satellite disclosed herein will then conduct station keeping operations to maintain position while the motion of the unstable space debris is analyzed. [See FIG. 4].

In some embodiments, the expulsion of a gas by the satellite imparts a force (e.g., linear (i.e., thrust) or torque (i.e., rotation)) on the satellite. In some embodiments, the force propels or rotates the satellite away from the unstable space debris. In some embodiments, a satellite disclosed herein maintains its orientation referenced to the mutually orthogonal X, Y and Z axes of the unstable space debris. In some embodiments, a satellite disclosed herein has an active control system. In some embodiments, the active control system comprises a reaction control system (RCS), control moment gyroscopes (CMG), magnetic torque converters for attitude control, or a combination thereof. In some embodiments, the active control system is sized to perform station keeping and to maintain attitude sufficient to counter the forces imparted on the satellite by the gas impingement system as it is operating. In some embodiments, a satellite disclosed herein further comprises a main engine and an orbital maneuvering system or thruster.

Arms

In certain instances, in order to stabilize the unstable space debris that is unstable in all three axes, there must be at least one "target point" on, or near to, each of the mutually orthogonal axes. In order to access each of the target points, the opening through which a gas plume is expelled must be oriented such that the gas plume will impact the target points but is maintained outside the keep-out space. In some embodiments, the opening through which a gas jet is expelled is maneuvered into place by use of at least one maneuverable arm. In some embodiments, a satellite disclosed herein comprises at least two arms. In some embodiments, a satellite disclosed herein comprises three arms.

In some embodiments, each arm is mechanically articulated. In some embodiments, each mechanically articulated arm is flexible instead of rigid.

Motion Analysis

In some embodiments, the satellite analyzes the motion of the unstable space debris. In some embodiments, the motion of the debris is analyzed via use of a laser tracking system. In some embodiments, the satellite comprises a means for laser tracking. The laser tracking system (or Laser Radar—LIDAR) consists of a laser transmitter that can transmit short, low power laser pulses at the space debris and a receiver that can detect the reflected laser pulses and measure the time (of arrival) and direction of the reflected laser pulse. The data from the laser tracking system is processed by a computer to develop a three dimensional virtual model of the debris which can be used for analysis to determine structural integrity and locations and orientation of the space debris and its components. The laser tracking system can also track specific points on the space debris and identify the velocity, direction and acceleration of those points. That data from the laser tracking system is computer analyzed to determine the rotational axes, rotational rates, rotational momentum, and rotational direction of the space debris as part of developing and executing the stabilization plan.

In some embodiments, the satellite analyzes the motion of the unstable space debris. In some embodiments, the motion of the debris is analyzed via use of a radar (or other radio frequency) tracking system. In some embodiments, a satellite comprises a means for radar tracking. The radar (or other radio frequency) tracking system consists of a microwave frequency transmitter that can transmit short, low power electromagnetic pulses at the space debris and a receiver that can detect the reflected electromagnetic pulses and measure the time (of arrival) and direction of the reflected pulse. The data from the radar tracking system is processed by a computer to develop a three dimensional virtual model of the debris which can be used for analysis to determine structural integrity and locations and orientation of the space debris and its components. The radar tracking system can also track specific points on the space debris and identify the velocity, direction and acceleration of those points. That data from the radar tracing system is computer analyzed to determine the rotational axes, rotational rates, rotational momentum, and rotational direction of the space debris as part of developing and executing the stabilization plan.

In some embodiments, the satellite analyzes the motion of the unstable space debris. In some embodiments, the motion of the debris is analyzed via use of an optical tracking system. In some embodiments, a satellite comprises a means for optical tracking. An optical tracking system consists of one of more optical sensor(s) (receivers) that collects ambient reflected light (defined as a passive optical system) or reflected light generated by a light source (defined as an active optical systems) (transmitter). A single optical tracking sensor can track color differences, light and dark images, edges, read symbols and wording, and can determine the direction and two dimensional motion of specific target points. An optical tracking system consisting of more than one sensor can additionally use binocular vision to determine the range to specific target points and determine three dimensional motion. The data from the optical tracking system is processed by a computer to develop a three dimensional virtual model of the debris which can be used for analysis to determine structural integrity and the location and orientation of the space debris and its components. The optical tracking system can also track specific points on the space debris and identify the velocity, direction and acceleration of those points. That data from the optical tracking system is computer analyzed to determine the rotational axes, rotational rates, rotational momentum, and rotational direction of the space debris as part of developing and executing the stabilization plan.

In some embodiments, the satellite analyzes the motion of the unstable space debris. In some embodiments, the motion of the debris is analyzed via use of a combination of (a) laser tracking systems, (b) radar (or other radio frequency) tracking systems, and/or (c) optical tracing systems. In some embodiments, the satellite comprises a means for (a) laser tracking, (b) radar (or other radio frequency) tracking, and/or (c) optical tracking.

Calculations

In some embodiments, a satellite disclosed herein comprises a means for calculating the amount of force to be applied to the unstable space debris, the number and timing of the gas pulses to be applied to the unstable space debris, or a combination thereof. In some embodiments, the means for performing the aforementioned calculations is an on-board computer module. In some embodiments, the means for performing these calculations is a ground-based computer module that communicates (as previously described) with the satellite. In some embodiments, the means for performing these calculations is a combination of on-board and ground based systems.

Reusability

Most space vehicles are built to be expendable at "end of life" (EOL) due to the difficulty of refueling and remotely maintaining a space vehicle on orbit. In some embodiments, the satellite disclosed herein is reusable. In some embodiments, a satellite disclosed herein is maintainable (i.e., components can be removed and replaced). In some embodiments, a satellite disclosed herein is refuelable (both maneuvering propellant and impingement gas).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

Example 1

Method of Stabilizing Unstable Space Debris Via Pneumatic Impingement

There are several hundred non-functioning rocket bodies (r/b) and spacecraft (s/c) in Low Earth Orbit (LEO) between 600 kilometers (km) and 2,000 km altitude which create the potential for an impact that will increase the population of space debris in LEO. In order to reduce the probability of collision, a decision is made to capture and de-orbit several of these rocket bodies and spacecraft each year. After surveying the non-functioning spacecraft and rocket bodies in that altitude band, it is determined that Rocket Body One has the highest potential for collision and so it becomes the highest priority to de-orbit. It is also determined that the attitude and orientation of Rocket Body One is unstable, that it exhibits characteristics of rotational motion in three axes, and that the rotational motion is coupled between all three axes so that the rotational motion appears to be random. Rocket Body One must be stabilized before it can be captured and de-orbited. Pneumatic (plume) impingement is used to stabilize the rocket body.

The pneumatic (plume) impingement stabilization spacecraft executes a rendezvous with Rocket Body One. This is done by using the main propulsion system to propel the pneumatic (plume) impingement stabilization spacecraft from its initial orbit into the orbit of Rocket Body One. As the pneumatic (plume) impingement stabilization spacecraft begins to rendezvous with Rocket Body One, sensors onboard the pneumatic (plume) impingement stabilization spacecraft track Rocket Body One to measure its dimensions. As Rocket Body One rotates, it sweeps out a spherical volume of space about its center of mass—the "keep out space". The pneumatic (plume) impingement stabilization spacecraft remains outside this "keep out space" by maintaining at least a range from the center of mass of Rocket Body One that is greater than the radius of the spherical volume of space that Rocket Body One sweeps out as it rotates about its center of mass.

Next, the pneumatic (plume) impingement orbital debris stabilization spacecraft maneuvers around Rocket Body One and conducts a scan of Rocket Body One determining the structural integrity and developing a three dimensional map of Rocket Body One. The information, developed from the scan of Rocket Body One by sensors onboard the pneumatic (plume) impingement stabilization spacecraft, is used as an input by the pneumatic (plume) impingement system planner to develop a stabilization plan that will not exceed structural integrity limits based on external appendages, such as antennae and solar panels, or other residual structural limitations identified during the scan.

Once the condition of the rocket body is determined, the linear motion is characterized, the axes about which Rocket Body One is rotating are determined, and the rotational motion of Rocket Body One is determined by analysis of the data measured during the survey of Rocket Body One. The pneumatic (plume) impingement system planner develops a debris stabilization plan based on this data. The debris stabilization plan consists of (at least) one target point on an axis of motion perpendicular to each of the axes about which the debris is rotating. Since Rocket Body One is rotating about all three axes of rotation, the debris stabilization plan requires three targets points. The planner also develops a sequence of thruster firings designed to create a sequence of pneumatic jets (plumes) that will impinge on the target points, transferring the force of those pneumatic jets (plumes) to the target points which creates torques on Rocket Body One that are opposite to the rotations of Rocket Body One. The total sequence of thruster firings is designed to reduce the rotational motion of Rocket Body One to zero about at least two of the three axes of rotation. The planner also determines pulse duration and variations in the force of each thruster firing. The force transferred to each target point is a function of the force of each pneumatic jet (plume) and the angle of impact of the plume on the target point. Since Rocket Body One is rotating, the time and angle each target point is exposed to the pneumatic jet (plume) varies as a function of the rotational rate of Rocket Body One. The planner also develops a plan for the pneumatic (plume) impingement orbital debris stabilization spacecraft guidance, navigation and control system which will counter the forces imparted on the pneumatic (plume) impingement orbital debris stabilization spacecraft by the firing of the pneumatic (plume) impingement, so that the pneumatic (plume) impingement orbital debris stabilization spacecraft can perform station keeping in order to maintain its orientation and distance to Rocket Body One.

The pneumatic (plume) impingement orbital debris stabilization spacecraft positions itself and orients the pneumatic (plume) stabilization system nozzles to aim at the target points based on the stabilization plan. The pneumatic impingement system generates pulses of pneumatic jets (gas plumes) consisting of the affluent generated by the combustion of a fuel and oxidizer carried by the pneumatic (plume) impingement orbital debris stabilization spacecraft (bi-propellant base system).

These pulses are directed at the selected target points on Rocket Body One. Each pulse is timed to impact the target points while the target points are perpendicular to the pneumatic jets (gas plumes) and the pneumatic jets (gas plumes) are tangential to the arc of rotation. The pneumatic (plume) impingement orbital debris stabilization spacecraft uses its guidance, navigation and control system to maintain its position and orientation by countering the force that the pneumatic impingement system imparted on the pneumatic impingement orbital debris stabilization spacecraft.

While the pneumatic (plume) impingement orbital debris stabilization spacecraft is executing the pneumatic impingement plan, it tracks the rocket body with sensors to determine if the torque that is generated by the impingement of the gas plume on the target points is reducing the rotational energy and motion of the rocket body as planned. The pneumatic (plume) impingement system planner processes the data from the sensors and uses that feedback to continuously monitor and update the stabilization plan.

The pneumatic (plume) impingement orbital debris stabilization spacecraft continues to execute the stabilization plan, monitoring the affect on Rocket Body One, processes the feedback and updates the stabilization plan, until the rotational motion is reduced to zero in the selected axes of rotation.

Example 2

Method of Stabilizing Unstable Space Debris and Capturing the Stabilized Space Debris There are several hundred non-functioning rocket bodies (r/b) and spacecraft (s/c) in Low Earth Orbit (LEO) between 600 kilometers (km) and 2,000 km altitude which create the potential for an impact that will increase the population of space debris in LEO. In order to reduce the probability of collision, a decision is made to capture and de-orbit several of these rocket bodies and spacecraft each year. After surveying the non-functioning spacecraft and rocket bodies in that altitude band, it is determined that Rocket Body Two has a high potential for collision and so it becomes a high priority to de-orbit. It is also determined that the attitude and orientation of Rocket Body Two is unstable, that it exhibits characteristics of rotational motion in three axes, and that the rotational motion is coupled between all three axes so that the rotational motion appears to be random. Rocket Body Two must be stabilized and then captured in order to be de-orbited. Pneumatic (plume) impingement is used to stabilize Rocket Body Two. The pneumatic (plume) impingement stabilization spacecraft will then capture Rocket Body Two and affix a mechanical device to de-orbit it.

The pneumatic (plume) impingement stabilization spacecraft executes a rendezvous with Rocket Body Two. This is done by using the main propulsion system to propel the pneumatic (plume) impingement stabilization spacecraft from its initial orbit into the orbit of Rocket Body Two. As the pneumatic (plume) impingement stabilization spacecraft begins to rendezvous with Rocket Body Two, sensors onboard the pneumatic (plume) impingement stabilization spacecraft track Rocket Body Two to measure its dimensions. As Rocket Body Two rotates, it sweeps out a spherical volume of space about its center of mass—the "keep out space". The pneumatic (plume) impingement stabilization spacecraft remains outside this "keep out space" by maintaining at least a range from the center of mass of Rocket Body Two that is greater than the radius of the spherical volume of space that Rocket Body Two sweeps out as it rotates about its center of mass.

Next, the pneumatic (plume) impingement orbital debris stabilization spacecraft maneuvers around Rocket Body Two and conducts a scan of Rocket Body Two determining the structural integrity, developing a three dimensional map of Rocket Body Two, and identifying structurally rigid points on Rocket Body Two where Rocket Body Two can be mechanically captured. The information, developed from the scan of Rocket Body Two by sensors onboard the pneumatic (plume) impingement stabilization spacecraft, is used as an input by the pneumatic (plume) impingement system planner to develop a stabilization plan that will not exceed structural integrity limits based on external appendages, such as antennae and solar panels, or other residual structural limitations identified during the scan.

Once the condition of the rocket body is determined, the linear motion is characterized, the axes about which Rocket Body Two is rotating are determined, and the rotational motion of Rocket Body Two is determined by analysis of the data measured during the survey of Rocket Body Two. The pneumatic (plume) impingement system planner develops a debris stabilization plan based on this data. The debris stabilization plan consists of (at least) one target point on an axis of motion perpendicular to each of the axes about which the debris is rotating. Since Rocket Body Two is rotating about all three axes of rotation, the debris stabilization plan requires three targets points. The planner also develops a sequence of thruster firings designed to create a sequence of pneumatic jets (plumes) that will impinge on the target points, transferring the force of those pneumatic jets (plumes) to the target points which creates torques on Rocket Body Two that are opposite to the rotations of Rocket Body Two. The total sequence of thruster firings is designed to reduce the rotational motion of Rocket Body Two to zero about at least two of the three axes of rotation. The planner also determines pulse duration and variations in the force of each thruster firing. The force transferred to each target point is a function of the force of each pneumatic jet (plume) and the angle of impact of the plume on the target point. Since Rocket Body Two is rotating, the time and angle each target point is exposed to the pneumatic jet (plume) varies as a function of the rotational rate of Rocket Body Two. The planner also develops a plan for the pneumatic (plume) impingement orbital debris stabilization spacecraft guidance, navigation and control system which will counter the forces imparted on the pneumatic (plume) impingement orbital debris stabilization spacecraft by the firing of the pneumatic (plume) impingement, so that the pneumatic (plume) impingement orbital debris stabilization spacecraft can perform station keeping in order to maintain its orientation and distance to Rocket Body Two.

The pneumatic (plume) impingement orbital debris stabilization spacecraft positions itself and orients the pneumatic (plume) stabilization system nozzles to aim at the target points based on the stabilization plan. The pneumatic impingement system generates pulses of pneumatic jets (gas plumes) consisting of the affluent generated by the combustion of a fuel and oxidizer carried by the pneumatic (plume) impingement orbital debris stabilization spacecraft (bi-propellant base system).

These pulses are directed at the selected target points on Rocket Body Two. Each pulse is timed to impact the target points while the target points are perpendicular to the pneumatic jets (gas plumes) and the pneumatic jets (gas plumes) are tangential to the arc of rotation. The pneumatic (plume) impingement orbital debris stabilization spacecraft uses its guidance, navigation and control system to maintain its position and orientation by countering the force that the pneumatic impingement system imparted on the pneumatic impingement orbital debris stabilization spacecraft.

While the pneumatic (plume) impingement orbital debris stabilization spacecraft is executing the pneumatic impingement plan, it tracks the rocket body with sensors to determine if the torque that is generated by the impingement of the gas plume on the target points is reducing the rotational energy and motion of the rocket body as planned. The pneumatic (plume) impingement system planner processes the data from the sensors and uses that feedback to continuously monitor and update the stabilization plan.

The pneumatic (plume) impingement orbital debris stabilization spacecraft continues to execute the stabilization plan, monitoring the affect on rocket body two, processes the feedback and updates the stabilization plan, until the rotational motion is reduced to zero in the selected axes of rotation.

Once the pneumatic (plume) impingement orbital debris stabilization spacecraft stabilizes the rotational motion of Rocket Body Two by eliminating the rotational motion in at least two of the three axes of motion, it proceeds to capture Rocket Body Two by mechanically latching onto the main propulsion system thrust nozzle. The pneumatic (plume) impingement orbital debris stabilization spacecraft maneuvers to a position in alignment with the thrust nozzle and with sufficient separation to ensure that the end effecters are clear of the thrust nozzle. Using the pneumatic (plume) impingement orbital debris stabilization spacecraft thrusters, the stabilization spacecraft slowly closes the range between the stabilization spacecraft and rocket body two maintaining alignment with the rocket body two thrust nozzle. The pneumatic (plume) impingement orbital debris stabilization spacecraft thrusters also match any rocket body two residual rotation rates that are not eliminated during the stabilization process. Closure rates are controlled such that the impact forces will not damage either spacecraft, or will cause a reaction bounce that will force a separation between the spacecraft. Four articulated arms with articulated end effectors are positioned so that one end effector is outside the thrust cone and one end effector is inside the thrust cone. After contact, the end effecters are engaged to capture rocket body two.

Once the capture is completed, the pneumatic (plume) impingement orbital debris stabilization spacecraft releases a de-orbit module and moves to separate itself and Rocket Body Two. Once there is sufficient between the stabilization spacecraft and rocket body two, the de-orbit module is activated and it imparts sufficient force on rocket body two to create a linear deceleration of Rocket Body Two that will cause it to lose altitude and ultimately de-orbit.

Example 3

Method of Stabilizing Unstable Space Debris and Altering the Orbital Path the Stabilized Space Debris There are several hundred non-functioning rocket bodies (r/b) and spacecraft (s/c) in Low Earth Orbit (LEO) between 600 kilometers (km) and 2,000 km altitude which create the potential for an impact that will increase the population of space debris in LEO. In order to reduce the probability of collision, a decision is made to capture and de-orbit several of these rocket bodies and spacecraft each year. After surveying the non-functioning spacecraft and rocket bodies in that altitude band, it is determined that Spacecraft One has a high potential for collision and so it becomes a high priority to de-orbit. It is also determined that the attitude and orientation of Spacecraft One is unstable, that it exhibits characteristics of rotational motion in three axes, and that the rotational motion is coupled between all three axes so that the rotational motion appears to be random. Spacecraft One must be stabilized and then captured in order to be de-orbited. Pneumatic (plume) impingement is used to stabilize Spacecraft One. The pneumatic (plume) impingement stabilization spacecraft will then alter the orbit of Spacecraft One to de-orbit it.

The pneumatic (plume) impingement stabilization spacecraft executes a rendezvous with Spacecraft One. This is done by using the main propulsion system to propel the pneumatic (plume) impingement stabilization spacecraft from its initial orbit into the orbit of Spacecraft One. As the pneumatic (plume) impingement stabilization spacecraft begins to rendezvous with Spacecraft One, sensors onboard the pneumatic (plume) impingement stabilization spacecraft track Spacecraft One to measure its dimensions. As Spacecraft One rotates, it sweeps out a spherical volume of space about its center of mass—the "keep out space". The pneumatic (plume) impingement stabilization spacecraft remains outside this "keep out space" by maintaining at least a range from the center of mass of Spacecraft One that is greater than the radius of the spherical volume of space that Spacecraft One sweeps out as it rotates about its center of mass).

Next, the pneumatic (plume) impingement orbital debris stabilization spacecraft maneuvers around Spacecraft One and conducts a scan of Spacecraft One determining the structural integrity and developing a three dimensional map of Spacecraft One. The information, developed from the scan of Spacecraft One by sensors onboard the pneumatic (plume) impingement stabilization spacecraft, is used as an input by the pneumatic (plume) impingement system planner to develop a stabilization plan that will not exceed structural integrity limits based on external appendages, such as antennae and solar panels, or other residual structural limitations identified during the scan.

Once the condition of the rocket body is determined, the linear motion is characterized, the axes about which Spacecraft One is rotating are determined, and the rotational motion of Spacecraft One is determined by analysis of the data measured during the survey of Spacecraft One. The pneumatic (plume) impingement system planner develops a debris stabilization plan based on this data. The debris stabilization plan consists of (at least) one target point on an axis of motion perpendicular to each of the axes about which the debris is rotating. Since Spacecraft One is rotating about all three axes of rotation, the debris stabilization plan requires three targets points. The planner also develops a sequence of thruster firings designed to create a sequence of pneumatic jets (plumes) that will impinge on the target points, transferring the force of those pneumatic jets (plumes) to the target points which creates torques on Spacecraft One that are opposite to the rotations of Spacecraft One. The total sequence of thruster firings is designed to reduce the rotational motion of Spacecraft One to zero (or, to substantially zero) about at least two of the three axes of rotation. The planner also determines pulse duration and variations in the force of each thruster firing. The force transferred to each target point is a function of the force of each pneumatic jet (plume) and the angle of impact of the plume on the target point. Since Spacecraft One is rotating, the time and angle each target point is exposed to the pneumatic jet (plume) varies as a function of the rotational rate of Spacecraft One. The planner also develops a plan for the pneumatic (plume) impingement orbital debris stabilization spacecraft guidance, navigation and control system which will counter the forces imparted on the pneumatic (plume) impingement orbital debris stabilization spacecraft by the firing of the pneumatic (plume) impingement, so that the pneumatic (plume) impingement orbital debris stabilization spacecraft can perform station keeping in order to maintain its orientation and distance to Spacecraft One. In addition, since the pneumatic (plume) impingement orbital debris stabilization spacecraft will use its pneumatic (plume) stabilization system to alter the orbital path of Spacecraft One, the stabilization plan is developed so that Spacecraft One, once it is stabilized, is oriented with a structural element (in this case, the main propulsion system thrust nozzle) that is aligned with the velocity vector of Spacecraft One and is on the leading side of Spacecraft.

The pneumatic (plume) impingement orbital debris stabilization spacecraft positions itself and orients the pneumatic (plume) stabilization system nozzles to aim at the target points based on the stabilization plan. The pneumatic impingement system generates pulses of pneumatic jets (gas plumes) consisting of the affluent generated by the combustion of a fuel and oxidizer carried by the pneumatic (plume) impingement orbital debris stabilization spacecraft (bi-propellant base system).

These pulses are directed at the selected target points on Spacecraft One. Each pulse is timed to impact the target points while the target points are perpendicular to the pneumatic jets (gas plumes) and the pneumatic jets (gas plumes) are tangential to the arc of rotation. The pneumatic (plume) impingement orbital debris stabilization spacecraft uses its guidance, navigation and control system to maintain its position and orientation by countering the force that the pneumatic impingement system imparted on the pneumatic impingement orbital debris stabilization spacecraft.

While the pneumatic (plume) impingement orbital debris stabilization spacecraft is executing the pneumatic impingement plan, it tracks the rocket body with sensors to determine if the torque that is generated by the impingement of the gas plume on the target points is reducing the rotational energy and motion of the rocket body as planned. The pneumatic (plume) impingement system planner processes the data from the sensors and uses that feedback to continuously monitor and update the stabilization plan.

The pneumatic (plume) impingement orbital debris stabilization spacecraft continues to execute the stabilization plan, monitoring the affect on Spacecraft One, processes the feedback and updates the stabilization plan, until the rotational motion is reduced to zero in the selected axes of rotation.

The stabilization plan is executed such that Spacecraft One is oriented with the main propulsion system thrust nozzle aligned with the velocity vector of Spacecraft One. The main propulsion system thrust nozzle is the target point that the pneumatic (plume) impingement orbital debris stabilization spacecraft will use to impart a force, using pneumatic impingement, opposite to the direction of Spacecraft One's velocity vector—this force being sufficient to reduce the magnitude of the velocity vector of Spacecraft One so that Spacecraft One will de-orbit.

The pneumatic (plume) impingement orbital debris stabilization spacecraft maneuvers to a position in alignment with the velocity vector of Spacecraft One. Using the pneumatic (plume) impingement orbital debris stabilization spacecraft thrusters, the stabilization spacecraft fires a continuous gas jet (plume) targeted at Spacecraft One's mail propulsion system thrust nozzle. The gas jet (plume) cuts off, once the velocity of Spacecraft One is decelerated sufficiently to ensure de-orbit of Spacecraft One. During the firing of the stabilization spacecraft's thrusters, the pneumatic (plume) impingement orbital debris stabilization spacecraft uses its internal GNC and RCS systems to maintain its position relative to Spacecraft One. After Spacecraft One's orbital parameters are altered sufficiently to de-orbit Spacecraft One, the pneumatic (plume) impingement orbital debris stabilization spacecraft's internal GNC and RCS systems are used to stabilize pneumatic (plume) impingement orbital debris stabilization spacecraft's orbit so that it does not de-orbit with Spacecraft One.

Example 4

Method of Stabilizing Unstable Space Debris Using Electromagnetic Fields

There are several hundred non-functioning rocket bodies (r/b) and spacecraft (s/c) in Low Earth Orbit (LEO) between 600 kilometers (km) and 2,000 km altitude which create the potential for an impact that will increase the population of space debris in LEO. In order to reduce the probability of collision, a decision is made to capture and de-orbit several of these rocket bodies and spacecraft each year. After surveying the non-functioning spacecraft and rocket bodies in that altitude band, it is determined that Rocket Body Three has a high potential for collision and so it becomes a high priority to de-orbit. It is also determined that the attitude and orientation of Rocket Body Three is unstable, that it exhibits characteristics of rotational motion in three axes, and that the rotational motion is coupled between all three axes so that the rotational motion appears to be random. Rocket Body Three must be stabilized and then captured in order to be de-orbited. An orbital debris stabilization spacecraft will use an electromagnetic field to stabilize Rocket Body Three. The orbital debris stabilization spacecraft will then capture Rocket Body Three and affix a mechanical device to de-orbit it.

The orbital debris stabilization spacecraft executes a rendezvous with Rocket Body Three. This is done by using the main propulsion system to propel the orbital debris stabilization spacecraft from its initial orbit into the orbit of Rocket Body Three. As the orbital debris stabilization spacecraft begins to rendezvous with Rocket Body Three, sensors onboard the orbital debris stabilization spacecraft track Rocket Body Three to measure its dimensions. As Rocket Body Three rotates, it sweeps out a spherical volume of space about its center of mass—the "keep out space". The orbital debris stabilization spacecraft remains outside this "keep out space" by maintaining at least a range from the center of mass of Rocket Body Three that is greater than the radius of the spherical volume of space that Rocket Body Three sweeps out as it rotates about its center of mass.

Next, the orbital debris stabilization spacecraft maneuvers around Rocket Body Three and conducts a scan of Rocket Body Three determining the structural integrity of Rocket Body Three to determine if it has sufficient structural integrity to be subject to electromagnetic stabilization, if there is sufficient conductive material to support electromagnetic stabilization and to determined the rotational motion of Rocket Body Three by analysis of the data measured during the survey of Rocket Body Three.

The orbital debris stabilization spacecraft positions itself and orients its antenna toward Rocket Body Three so that Rocket Body Three will rotate within the electromagnetic field generated by the orbital debris stabilization spacecraft.

The orbital debris stabilization spacecraft powers the electromagnetic field orbital debris stabilization system, generating an electromagnetic field that encompasses Rocket Body Three and which generates electrical currents ("eddy currents") on, or within, the conductive material which is part of Rocket Body Three. As Rocket Body Three continues to rotate within the electromagnetic field being created by the orbital debris stabilization spacecraft, the electrical currents ("eddy currents") on, or within, the conductive material which is part of Rocket Body Three interact with the naturally occurring planetary magnetic fields. The forces created by this interaction attempt to align the electrical currents ("eddy currents") on, or within, the conductive material which is part of Rocket Body Three and the naturally occurring planetary magnetic fields. As the rotation of Rocket Body Three begins to dampen out by the force between the eddy currents and the naturally occurring planetary magnetic field, the electrical currents ("eddy currents") on, or within, the conductive material which is part of Rocket Body Three tend to weaken. Ultimately the rotational rates about at least two of the three axes are reduced to zero (or, to substantially zero) and Rocket Body Three is stabilized.

Once the orbital debris stabilization spacecraft stabilizes the rotational motion of Rocket Body Three by eliminating the rotational motion in at least two of the three axes of motion, it proceeds to capture Rocket Body Three by mechanically latching onto the main propulsion system thrust nozzle. The orbital debris stabilization spacecraft maneuvers to a position in alignment with the thrust nozzle and with sufficient separation to ensure that the end effecters are clear of the thrust nozzle. Using the orbital debris stabilization spacecraft thrusters, the stabilization spacecraft slowly closes the range between the orbital debris stabilization spacecraft and Rocket Body Three maintaining alignment with the Rocket Body Three thrust nozzle. The orbital debris stabilization spacecraft thrusters also match any Rocket Body Three residual rotation rates that are not eliminated during the stabilization process. Closure rates are controlled such that the impact forces will not damage either spacecraft, or will cause a reaction bounce that will force a separation between the spacecraft. Four articulated arms with articulated end effectors are positioned so that one end effector is outside the thrust cone and one end effector is inside the thrust cone. After contact, the end effecters are engaged to capture Rocket Body Three.

Once the capture is completed, the orbital debris stabilization spacecraft releases a de-orbit module and moves to separate itself and Rocket Body Three. Once there is sufficient between the orbital debris stabilization spacecraft and Rocket Body Three, the de-orbit module is activated and it imparts sufficient force on Rocket Body Three to create a linear deceleration of Rocket Body Three that will cause it to lose altitude and ultimately de-orbit.

Example 5

Testing and Verification through Computer Simulation

Testing and verification of the pneumatic (plume) impingement orbital debris stabilization spacecraft is achieved through computer simulation prior to implementation in an operational system. This same type of computer simulation is also usable as part of the planning process for actual missions to verify the stabilization plan prior to implementation and to verify that the expected affects of the plume impingement process match the simulated plan.

A computer simulation will require a virtual model of the pneumatic (plume) impingement orbital debris stabilization spacecraft, a physics based algorithm of the method of imparting force on the unstable space debris, a virtual model of the unstable space debris (including specification of rotational motion and orbital parameters), and a simulation of the space environment (including gravitation forces and other external forces and pressures that the unstable space debris and the pneumatic (plume) impingement orbital debris stabilization spacecraft will be subject to).

The computer simulation is used test and verify the full system performance, the performance of each subsystem, simulate the motion of the unstable space debris, simulate the affect of imparting forces on the unstable space debris, and all other mission phases.

Example 6

Testing and Verification Through Physical Simulation

Testing and verification of the pneumatic (plume) impingement orbital debris stabilization spacecraft is achieved through live (or, physical) methods to verify the suitability and performance of computer (or, virtual) simulations. Live (or, physical) testing is done on the ground. Live (or, physical) testing is done in two dimensions and three dimensions.

Two dimensional live (or, physical) testing is done on large "air bearing floors" available at NASA. An "air bearing floor" simulates a zero resistance two dimensional surface that simulates the motion of an object in space in two dimensions (x and y axis in a Cartesian coordinate system) by mounting physical models of the unstable space debris and the pneumatic (plume) impingement orbital debris stabilization spacecraft on flat bottomed sleds that then ride on a thin cushion of air that is injected from the floor of the test facility. Using this system, we test and verify system performance in two dimensions and replicate roll, pitch and yaw. After verifying system performance in two dimensions, we extend the simulation into three dimensions mathematically.

Three dimensional live (or physical) testing is done using a similar testing facility with the addition of an "overhead gantry" with a mechanical arm that can dynamically simulate motion relative to a fixed object on the ground, or a movable object on an "air Bearing floor". This type of live simulated environment can replicate 8 degrees of freedom including bridge, trolley, waist, shoulder, extension, roll, yaw, and pitch allowing for complete testing and development of this method of stabilizing unstable space debris.

The invention claimed is:

1. A satellite for stabilizing unstable space debris, comprising (a) routine systems and subsystems for operation of the satellite, and (b) at least a first and second nozzle configured to (i) generate a plurality of gas plume pulses from a gas, wherein the plurality of gas plume pulses have sufficient force to dampen rotational momentum about one or more axes of rotation of unstable space debris, and (ii) specifically target the plurality of gas plume pulses to at least a first target point and a second target point located on or near mutually orthogonal axes centered at center of mass of the unstable space debris.

2. The satellite of claim 1, wherein the plurality of gas plume pulses are collimated, convergent, divergent, or a combination thereof.

3. The satellite of claim 1, further comprising an active control system for maintaining position and attitude of the satellite.

4. The satellite of claim 1, further comprising a laser tracking system, a radar tracking system, an optical tracking system, or a combination thereof.

5. The satellite of claim 1, further comprising a computer module for calculating strength, duration, timing, and number of the gas plume pulses necessary to stabilize the unstable space debris.

6. The satellite of claim 5, wherein the computer module is an on-board computer module, a ground-based computer module or a combination thereof.

7. The satellite of claim 1, wherein the gas is compressed gas.

8. The satellite of claim 7, wherein the gas is hydrogen ($H_2$), helium ($He_2$), xenon (Xe), argon (Ar), neon (Ne), freon, gaseous ammonia, or nitrogen ($N_2$).

9. The satellite of claim 1, wherein the gas is the product of vaporization of a liquefied gas, combustion of an oxidizer and a propellant, exothermic decomposition of a monopropellant, or any combination thereof.

10. The satellite of claim 9, wherein the oxidizer is selected from liquid oxygen (LOX), gaseous oxygen (GOX), fluorine ($F_2$), oxygen difluoride ($OF_2$), Tetrafluorohydrazine ($N_2F_2$), or Chlorine pentafluoride ($ClF_5$); and a propellant is selected from hydrogen (H2), Kerosene products such as Rocket Propellant 1 (RP-1) and Rocket Propellant 2 (RP-2), Methane (CH4), or Monomethylhydrazine (MMH).

11. The satellite of claim 9, wherein the monopropellant is hydrazine ($N_2H_4$) or hydrogen peroxide ($H_2O_2$).

12. The satellite of claim 1, wherein the gas is energized and accelerated by electrothermal, electrostatic, or electromagnetic means.

13. The satellite of claim 12, wherein the gas is selected from hydrogen ($H_2$), helium ($He_2$), xenon (Xe), argon (Ar), neon (Ne), nitrogen ($N_2$), ionized cesium (Cs), or ionized mercury (Hg).

* * * * *

UNITED STATES PATENT AND TRADEMARK OFFICE
CERTIFICATE OF CORRECTION

PATENT NO. : 8,628,044 B2  
APPLICATION NO. : 13/531199  
DATED : January 14, 2014  
INVENTOR(S) : Dennis Poulos Page 1 of 1

It is certified that error appears in the above-identified patent and that said Letters Patent is hereby corrected as shown below:

In the Claims

Column 32, lines 5-11 should read

10. The satellite of claim 9, wherein the oxidizer is selected from liquid oxygen (LOX), gaseous oxygen (GOX), fluorine ($F_2$), oxygen difluoride ($OF_2$), Terafluorohydrazine ($N_2F_4$), or Chlorine pentafluoride ($ClF_5$); and a propellant is selected from hydrogen ($H_2$), Kerosene products such as Rocket Propellant 1 (RP-1) and Rocket Propellant 2 (RP-2), Methane ($CH_4$), or Monomethylhydrazine (MMH).

Signed and Sealed this  
First Day of April, 2014

Michelle K. Lee  
*Deputy Director of the United States Patent and Trademark Office*